(12) United States Patent
Peng et al.

(10) Patent No.: US 9,355,490 B2
(45) Date of Patent: May 31, 2016

(54) MINIMUM-MAXIMUM FILTERING OF GRAPHICAL TEXTURE DATA

(71) Applicants: Liang Peng, San Jose, CA (US); Steven Spangler, El Dorado Hills, CA (US); Yoav Harel, Folsom, CA (US)

(72) Inventors: Liang Peng, San Jose, CA (US); Steven Spangler, El Dorado Hills, CA (US); Yoav Harel, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 234 days.

(21) Appl. No.: 14/080,482

(22) Filed: Nov. 14, 2013

(65) Prior Publication Data

US 2015/0130819 A1    May 14, 2015

(51) Int. Cl.
| | |
|---|---|
| *G09G 5/00* | (2006.01) |
| *G06T 15/04* | (2011.01) |
| *G06T 11/00* | (2006.01) |
| *G06T 1/60* | (2006.01) |

(52) U.S. Cl.
CPC ............... *G06T 15/04* (2013.01); *G06T 11/001* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 6,366,290 | B1* | 4/2002 | Dye | G06T 15/04 345/582 |
| 7,477,261 | B2 | 1/2009 | Pallister | |
| 7,719,544 | B2 | 5/2010 | Boyd et al. | |
| 2006/0250407 | A1* | 11/2006 | Xu | G06T 15/04 345/582 |
| 2007/0008333 | A1* | 1/2007 | Xu | G06T 15/04 345/582 |
| 2011/0292048 | A1* | 12/2011 | Chien | G06T 15/04 345/426 |

OTHER PUBLICATIONS

Nickolls et al., "Graphics and Computing GPUs", Computer Organization and Design: The hardware/Software Interface, D. A. Patterson and J. L. Hennessy, 4th ed., Morgan Kaufmann, 2009, 76 pages.

* cited by examiner

*Primary Examiner* — Jacinta M Crawford
(74) *Attorney, Agent, or Firm* — Lynch Law Patent Group, P.C.

(57) ABSTRACT

Texture filter logic suitable for determining a minimum or maximum texel value from a plurality of texel values associated with a filter footprint of arbitrary shape and size. In embodiments, logic circuitry includes a plurality of min/max comparison block stages is configured to perform comparisons and determine a min/max value of predetermined number of texel groups. In embodiments, the logic circuitry further includes a number of min/max collectors to accommodate filter footprints having more texel groups than the predetermined number accommodated by the min/max comparison block stages. Iterative comparisons may be performed until all texel groups in the given footprint have been compared. In further embodiments, the logic circuitry outputs four min/max texel values, which may then be further processed with a final comparison stages to arrive at one min/max value for a footprint.

20 Claims, 26 Drawing Sheets

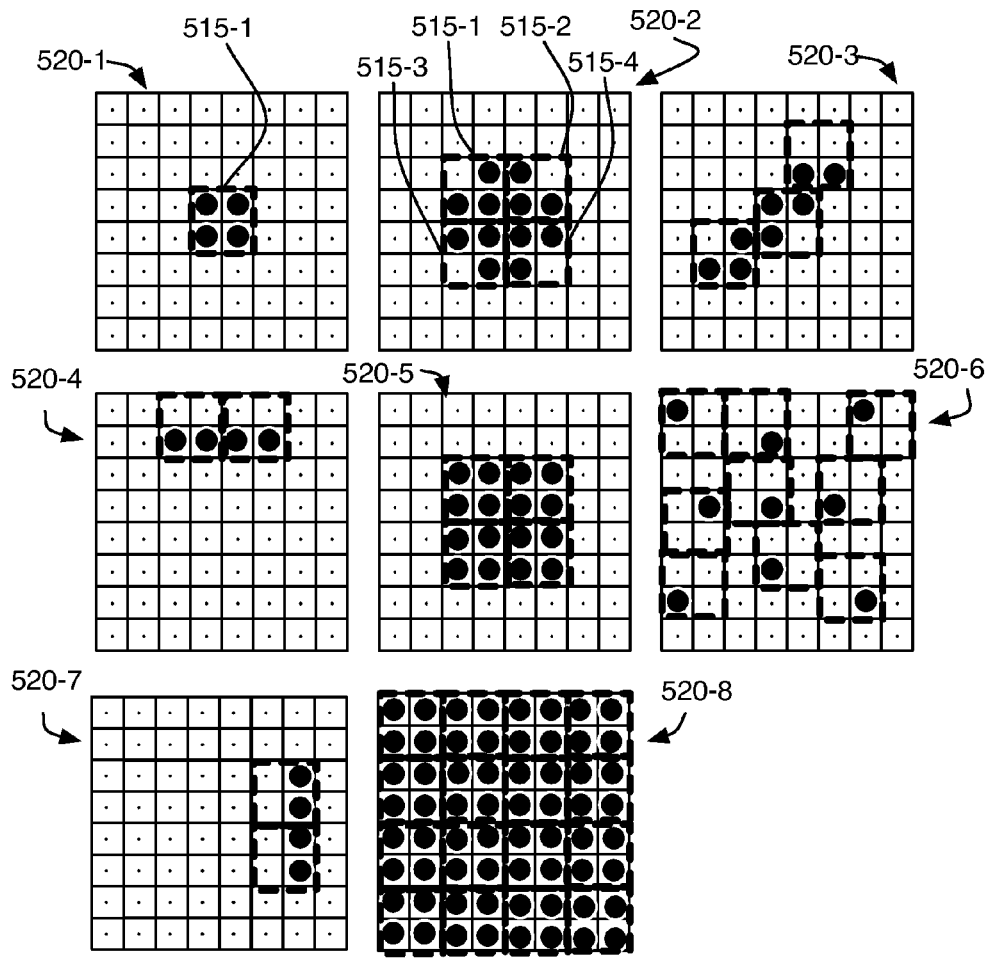
FIG. 5A
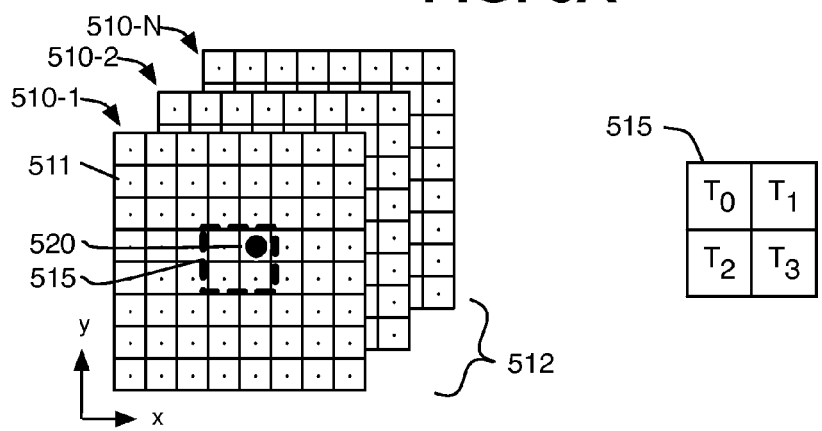
FIG. 5B  FIG. 5C

H-Coeff. Table
671

| $\beta_u$ | Tap$_0$ | Tap$_1$ | Tap$_2$ | Tap$_3$ | Tap$_4$ | Tap$_5$ | Tap$_6$ | Tap$_7$ | ••• | Tap$_{n-1}$ |
|---|---|---|---|---|---|---|---|---|---|---|
| .0 | HC[0:0] | HC[1:0] | | | | | | | | |
| .1 | HC[0:1] | HC[1:1] | ••• | | | | | | | |
| ⋮ | | | | | | | | | | |
| 1-Δβ$_u$ | | | | | | | | | | |

FIG. 6C

V-Coeff. Table
672

| $\beta_v$ | Tap$_0$ | Tap$_1$ | Tap$_2$ | Tap$_3$ | Tap$_4$ | Tap$_5$ | Tap$_6$ | Tap$_7$ | ••• | Tap$_{n-1}$ |
|---|---|---|---|---|---|---|---|---|---|---|
| .0 | VC[0:0] | VC[1:0] | | | | | | | | |
| .1 | VC[0:1] | VC[1:1] | ••• | | | | | | | |
| ⋮ | | | | | | | | | | |
| 1-Δβ$_u$ | | | | | | | | | | |

FIG. 6D

MINIMUM-MAXIMUM FILTERING OF GRAPHICAL TEXTURE DATA

TECHNICAL FIELD

Embodiments of the implementation generally relate to computer graphics, and more particularly relate to sampling and filtering of texture data.

BACKGROUND

Graphics rendering, particularly for three dimensional (3D) graphics applications, is one of the most processing intensive activities performed by personal computers. Graphics co-processors are available on most modern day personal computers. FIG. 1A, is a system 100 employing a graphics processor 101 and a central processor 102, each coupled to a system memory 103 (e.g., DRAM, eDRAM, etc.) by a bus. Central processor 102 and graphics processor 101 may be disposed on a single piece of silicon (i.e., a single-chip solution), or integrated at a package, board, or system level. Graphics processor 101 includes a plurality of parallel processing sub-systems, or slices 105. Each slice 105 may be replicated any number of times for greater parallel graphics processing power. Within slice 105, there are a number of execution units (EU) 110, also known as "shader cores," or simply "cores." Each EU 110 contains scalar integer and floating-point arithmetic units that execute instructions. Each EU 110 has an instruction set architecture (ISA), may support context switching and pre-emptive multi-tasking, and may be essentially a complete x86 core, for example. Along with EUs 110, slice 105 includes a level two (L2) cache 130 (e.g., SRAM, eDRAM, etc.) and texture sampler 120. Texture sampler 120 includes fixed function logic (e.g., state machines). Texture sampler 120 may communicate with EU 110 via cache 130. Cache 130 may function as a texture cache that is a read-only memory to texture sampler 120 holding large arrays of predetermined texture data for use in texture mapping when a graphic is rendered for display by a platform hosting system 100.

The transformation of scene information (source data) into displayable images requires a number of functionalities, referred to in aggregate as a 3D graphics rendering pipeline. FIG. 1B is flow diagram depicting certain operations particular to a texture mapping portion of the graphics rendering pipeline. Texture mapping 101 generally entails imaging a textured signal onto a primitive's geometry, for example giving the appearance of pixel-level detail on more coarsely rendered polygon meshes that are manipulated on a vertex basis. At operation 105, texture coordinates are assigned to vertices of a given polygon. Generally, a texture is a digital image comprising an array of texels (texture elements), which may be individually addressed based on location within a two-dimensional (u,v) coordinate space, or in a three-dimensional (u,v,s) coordinate space. In the (u,v) coordinate space, u is the width and v is the height, and may be mapped between 0 and 1 based on the texture width and height. At operation 107 the texture coordinates are interpolated at each pixel within the polygon. At operation 111, a texture color for each pixel is fetched into cache based on the interpolated texture coordinate. At operation 113, the texture is sampled and filtered to arrive at a particular texel color at each pixel. Often, there is a disparity between a number of sample texture elements (texels) and the source texture image and the number of picture elements (pixels) to which the image is mapped. If a texture is too large or too small for a given polygon, the texture is filtered to fit the space. A magnification filter enlarges (zooms-in) a texture, a minification filter reduces (zooms-out) the texture to fit into a smaller area. Texture magnification maps few texels to many pixels by repeating the sampled texel for a plurality of addresses, for example providing a blurrier image. Texture minification maps many texels to few pixels by combining more than one texel value into a single value. This can cause aliasing or jagged edges, and antialiasing techniques become important to reduce visual artifacts. The goal of texture filtering then is to compute the average value of the image over an area around each pixel, for example through averaging of many texels associated with a given pixel.

Texture filtering has largely been performed by fixed-function logic found in texture sampler 120. Such texture samplers have a fixed filter footprint (shape) associated with a type of texture filtering, such as point sampling, bi-linear filtering, tri-linear filtering, and anisotropic filtering. As the filtering methods become increasingly complex, and as uses for texture data continues to expand, for example, being used for lighting and other surface properties in addition to color, a sampler with a fixed-function filter has become inefficient and/or insufficient. As such, shader programs instantiated by EU 110 have taken larger roles in texture mapping, for example resulting in the architecture of system 106 illustrated in FIG. 1C. In system 106, EU 110 implements a filter footprint 140 in an application layer, and a plurality of texture requests in (u,v) space associated with footprint 140 are sent to the texture sampler 120. Texture sampler 120 then fetches texture data 115 into the cache for each of the (u,v) addresses associated with filter footprint 140. EU 110 executing instructions defined in the application layer then accumulates texture data 115. As such, texture data for an entire footprint is passed through the texture sampler with no data reduction because filtering is off-loaded from fixed-function logic 131 onto EU 110. In this configuration however, sampler chip area occupied by fixed-function logic 131 is wasted. Another issue with this architecture is reduced cache usage efficiency. With multiple sampler messages sent from a kernel there's a higher probability that the interleaved messages from multiple EUs will cause many cache evictions. Furthermore, texture mapping bandwidth is potentially constrained with the greater amount of data communicated between EU 110 and texture sampler 120 since texture data is not significantly processed and/or reduced by texture sampler 120. Another disadvantage of the system architecture depicted in FIG. 1C is that filtering performed by EU 110 may require more power and may be slower than if implemented with optimized, purpose-built logic within texture sampler 120. Therefore, the programmability afforded with shader-based filtering may be particularly disadvantageous for mobile devices executing graphics-intensive applications where the greater power demand translates into reduced battery life.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5A illustrates a variety of exemplary programmable footprints that may be implemented through application of a texel quad performed as part the method depicted in FIG. 4, in accordance with embodiments FIG. 5B depicts a plurality of footprints and corresponding bounding regions that may be employed in a multi-mode flexible texture sampler when performing the method depicted in FIG. 4, in accordance with embodiments;

FIG. 5C depicts a texel quad representing a minimum granularity of a multi-mode flexible texture sampler, in accordance with embodiments;

FIGS. 6C and 6D illustrates filter coefficient tables that may be populated in preparation of performing the separable filter method depicted in FIG. 6A, in accordance with embodiments;

DETAILED DESCRIPTION

Figure 1A:
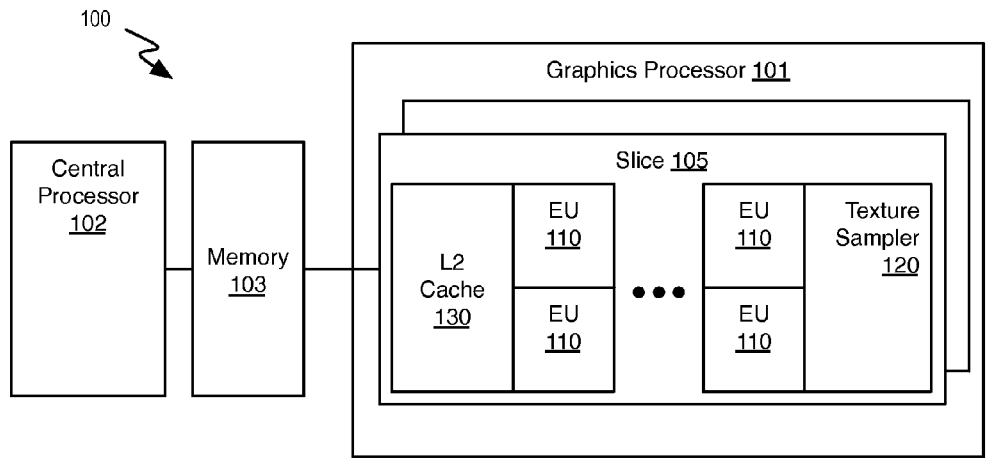
FIG. 1A, is a conventional system architecture including a central processor and a graphics processor.
Figure 1B:
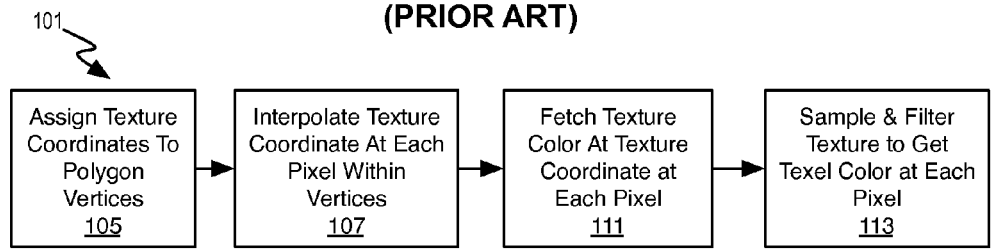
FIG. 1B is flow diagram depicting particular texture mapping operations in a typical graphics rendering pipeline within a graphics processor.
Figure 1C:
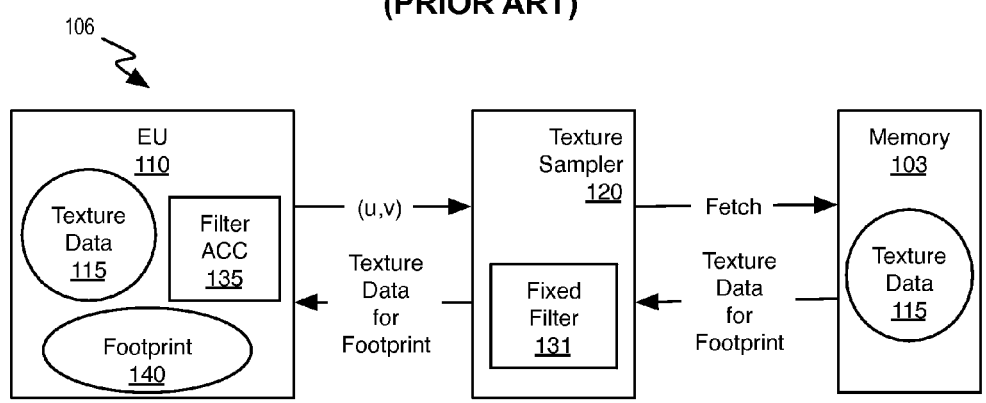
FIG. 1C is a conventional graphics processor architecture employing a shader for texture filtering.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that the present implementation may be practiced without these specific details. Well-known methods and devices are shown in block diagram form, rather than in detail, to avoid obscuring the present implementation. Reference throughout this specification to "an embodiment" or "one embodiment" means that a particular feature, structure, function, or characteristic described in connection with the embodiment is included in at least one embodiment of the implementation. Thus, the appearances of the phrase "in an embodiment" or "in one embodiment" in various places throughout this specification are not necessarily referring to the same embodiment of the implementation. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the implementation and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used in throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures or graphics processors for example, implementation of the techniques and/or arrangements described herein are not restricted to particular architectures and/or computing systems and may be implemented by any architecture and/or computing system for similar purposes. For example, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Figure 1D:
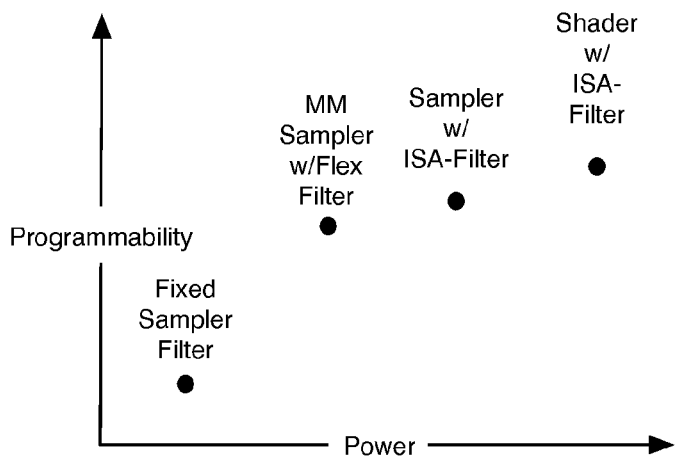
FIG. 1D is a graph comparing certain texture filtering architectures that may be utilized in a graphics processor.
Figure 1E:
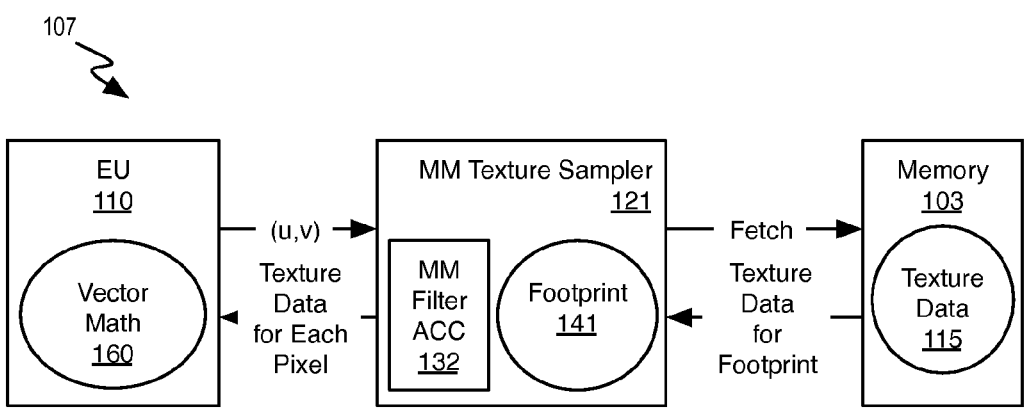
FIG. 1E is a graphics processor architecture employing a multi-mode texture sampler, in accordance with an embodiment.

Systems, apparatus, articles, and methods are described below including a multi-mode texture sampler capable of flexible filtering operations providing a high performance and low power solution for 2D and 3D visual computing applications. FIG. 1D is a graph comparing certain sampler architectures that may be employed by a graphics processor with respect to their relative power requirements and programmability. Near the origin is a fixed function sampler filter, offering for example a bi-linear texture filter. Highly optimized filter function logic may implement such a filter very economically for lowest power and high efficiency. However, the lack of programmability of this filter is unable to accommodate any application-specific filter. On the other extreme is the shader implementing an fully programmable ISA filter, which may accommodate any application-specific filtering operation but consumes the most power. One step down in power and programmability from the shader filter is a sampler with an ISA filter within sampler. For such an architecture, the sampler has some of the functionality currently found in a shader core/EU (e.g., a programmable register-based scalar instruction set, integer, logic, flow control, and memory access) in addition to the conversion and special functions typical of texture operations. The ISA filter in sampler can be expected to require power similar to the shader-core filter implementation and the greater sampler complexity requires significant increases in chip area. For further comparison, the power and programmability attributes of the exemplary multi-mode (MM) sampler with a flexible filter in accordance with embodiments herein is also depicted in FIG. 1E. The MM sampler embodiments described herein provide a significant increase in filter programmability, indeed arguably enabling the sampler to perform most any texture filtering currently implemented on an ISA filter. However, with only a slight increase in power, if any, relative to a fixed function sampler.

Relative to shader-based filters, the multi-mode texture sampler embodiments described herein may further provide more balanced heterogeneous computing, for example as depicted in the graphics processor architecture 107 of FIG. 1E. In exemplary architecture 107, EU 110 is to perform vector math 160, higher-level rendering algorithms, and memory writes, etc. When texture mapping is needed, a texture address (u,v) is communicated to a multi-mode (MM) texture sampler 121. For a given texture address, MM texture sampler 121 is to fetch texture data 115 for a variety of footprints 141, and reduce texture data 115 by processing with MM filter accumulator 132. MM filter accumulator 132 is suitable for providing output values corresponding to a weighted average over the variety of filter footprints 141. MM texture sampler 115 returns to the EU 110 reduced data corresponding a sampled, filtered pixel color (R/G/B) at each pixel. Unlike a fixed-function texture sampler, MM texture sampler 121 is configurable to accommodate both a wide variety of footprints and allow for a footprint to be significantly wider than the bi-linear (2×2 texel) footprint often employed in fixed-function minification filtering. The MM texture sampler 121 can require less power and reduced EU-to-sampler communication while still providing a greater level functionality, such as lighting/shadowing effects, heretofore available only through shader-based filters. In exemplary embodiments, in addition to supporting flexible footprints, MM texture sampler 121 further supports legacy fix-function modes, such as point and/or linear sampling, and bilinear and/or trilinear filter modes.

Figure 2:
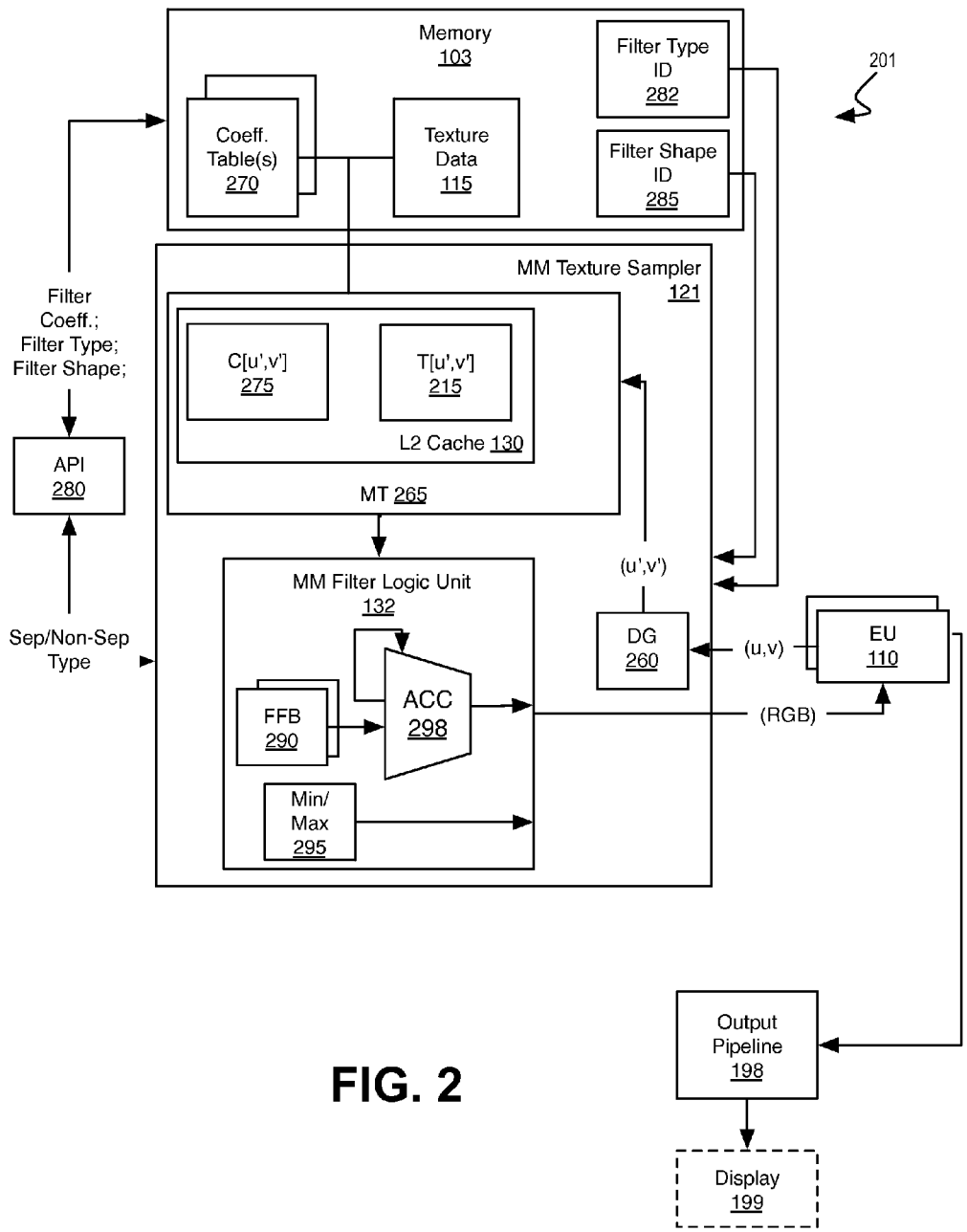
FIG. 2 is a functional block diagram further illustrating a system including a graphics processor with a multi-mode flexible texture sampler, in accordance with an embodiment.

FIG. 2 is a functional block diagram further illustrating a system 201 including a graphics processor employing multi-mode flexible texture sampler 121, in accordance with an embodiment. System 201 includes one or more EU 110 communicatively coupled to MM texture sampler 121. EU 110 is to provide an input texture address or coordinate, for example in (u,v) space, to MM texture sampler 121. While two dimensional texture addresses are employed in the description herein, it is noted that the techniques and hardware described herein may be adapted to greater dimensionality (e.g., 3D) by one of ordinary skill. MM sampler 121 includes a logic circuitry represented as data generator (DG) 260, which is to generate texel sampling addresses (i.e. sub-samples) based on the input texture address and a based further on a desired filter footprint. The sub-sample addresses (u',v') generated by DG 260 identify one or more texel sub-sampling position within a predetermined bounding region within which a footprint is defined. Sub-sampling addresses (u',v') are sequenced and passed to multi-thread (MT) unit 265, which is to fetch data into cache 130 and handle overhead associated with the cache FIFO (e.g., locality-based fetching, latency, cache misses, etc.). In embodiments herein, MT unit 265 caches texel data T[u',v'] 215 associated with each sub-sample address. Whereas a conventional fixed function sampler may be called upon to dynamically calculate filter coefficients for an input texture address, for example through a bi-linear interpolation algorithm, MT unit 265 further caches predetermined filter (weighting) coefficients 275 associated with each (u',v') sub-sample address (i.e., C[u',v']).

Filter coefficients 275 are an additional input to MM texture sampler 121. Filter coefficients 275 may be stored in memory 103, entered for example as one or more coefficient tables 270 through API 280. API 280 may be implemented for example as a set of extensions to an existing graphics processor API, such as, but not limited to, DirectX and OpenGL. API 280 exposes coefficient tables 270 to an application layer and may allow the tables to be populated with predetermined values appropriate for a given filter. As one example, an application layer routine that evaluates a Gaussian blur function may be executed to automatically generate coefficients values stored in coefficient tables 270. Fixed memory allocations for storing values in coefficient table(s) 270 may be made based on the size of the predetermined bounding region within which a footprint is defined, as well as the mode of the MM texture sampler.

In embodiments, MM texture sampler 121 is selectively operable in both a separable filter mode and a non-separable filter mode for any of a plurality of programmable filter footprints. In the exemplary embodiment, the non-separable filter mode implements the filter function, $$F = \sum_{x=0}^{m} \sum_{y=0}^{m} C_{xy} T_{xy}$$

where $C_{xy}$ is the filter coefficient for a given sampled address (u',v') and $T_{xy}$ is the texel (color) value for the given sampled address (u',v'). The weighting is generally performed over the entire bounding region, m, which is predetermined to be some fixed size sufficient to implement all desired footprints. In one exemplary embodiment, m=7, allowing for up to an 8×8 texel footprint to be defined. For such embodiments, coefficient table 270 includes one coefficient for each texel within the bounding region m. MM texture sampler 121 is further operable in a separable filter mode. In one exemplary embodiment, the separable filter mode implements the filter function:

$$F = \sum_{y=0}^{h-1} \sum_{x=0}^{w-1} H_{A,x} V_{B,y} T_{xy}$$

where $H_{A,x}$ is a horizontal filter coefficient, $V_{B,y}$ is a vertical filter coefficient for a given filter width w and height h defined within the predetermined bounding region. As for non-separable coefficient $C_{x,y}$, values of separable coefficients $H_{A,x}$ and $V_{B,y}$ may be stored in coefficient table(s) 270 as source data for cache fetches. While both the separable and non-separable filter modes are further described below in the context of the above exemplary filter functions, it is noted one of ordinary skill in the art may adapt the architecture and techniques described herein to another non-separable and/or separable filter function.

In embodiments, API 280 further exposes a filter type ID 282 that is indicative of the mode in which MM texture sampler 121 is to operate while remaining in a given state. For example, filter type ID 282 may store a flag bit, etc. specifying the non-separable or separable filter mode. In further embodiments, API 280 may additionally expose a filter shape ID 285. MM sampler 121, and more specifically DG 260, may utilize the filter shape ID 285 to efficiently generate contributing sub-sample addresses (i.e., those addresses within the predetermined bounding region having non-zero filter coefficients). In one embodiment of the separable filter mode, filter shape ID 285 stores the filter height h and width w of the separable filter. In one embodiment of the non-separable filter mode, filter shape ID 285 stores a bit mask that specifies filter coefficients within the bounding region that are non-zero. Such a bit mask may be generated, by a graphics processor driver for example, based on entries in the coefficient table(s) 270.

As further illustrated in FIG. 2, MM texture sampler 121 includes MM filter logic (FL) unit 132, which performs filtering and returns a color value (e.g., R/B/G, R/B/G/A, etc.) at each pixel based on the filter mode, filter footprint, texel values, and filter coefficient values. This returned value may then be utilized in output pipeline 198 and output to display 199 (or utilized in a hidden layer calculation, etc.). MM FL 132 includes flexible filter block (FFB) 290 having logic circuitry to perform filtering over any flexible footprint provided in either separable or non-separable filter modes. MM FL 132 further includes accumulator 298 that is to accumulate a plurality of flexible filter block outputs to generate a weighted average over a given flexible filter footprint. MM FL 132 may further include a divider (not depicted) to normalize output from FFB 290 or accumulator 298 before returning the filter value to EU 110. As such, MM FL 132 is configurable to perform weighted accumulation on colors of all texels within the footprint, for example as defined by filter type ID 282, and/or filter shape ID 265. In further embodiments, as described elsewhere herein, MM FL 132 is sufficiently generalized to also perform conventional bi-linear filtering at a rate unimpeded by the more flexible architecture of MM FL unit 132.

In embodiments, a filter logic unit includes logic to determine a minimum and/or maximum texel value over a given filter footprint. In the exemplary embodiment depicted in FIG. 2, FL 132 includes the flexible min/max logic 295, which takes as an input cached texel data, and outputs min/max texel values to EU 110. Advanced 3D graphics rendering techniques have increasingly employed the use of minimum and maximum values within a footprint. Applications where such min/max filtering may be useful include, but are not limited to, shadow generation where the minimum and maximum of all values in a footprint are useful to evaluate the effective coverage or softness of a shadow. For embodiments where the filter footprint may vary, the technique employed for determining a min/max of texels associated with the footprint is also advantageously flexible. While a shader-based min/max implementation may offer such flexibility, a solution of this type cannot provide optimal performance and also incurs a significant power consumption penalty relative to fixed function logic. Exemplary embodiments herein therefore entail a flexible min/max hardware logic unit as part of the texture filter logic. This architecture provides an efficient solution, in part, because the texel data can be processed for a given footprint through the flexible min/max logic circuitry as it is fetched into the cache by the sampler.

A more detailed description of the texture data processing techniques and microarchitecture of components introduced in exemplary system 201 are now discussed in turn.

Flexible Filter Footprints

Figure 3:
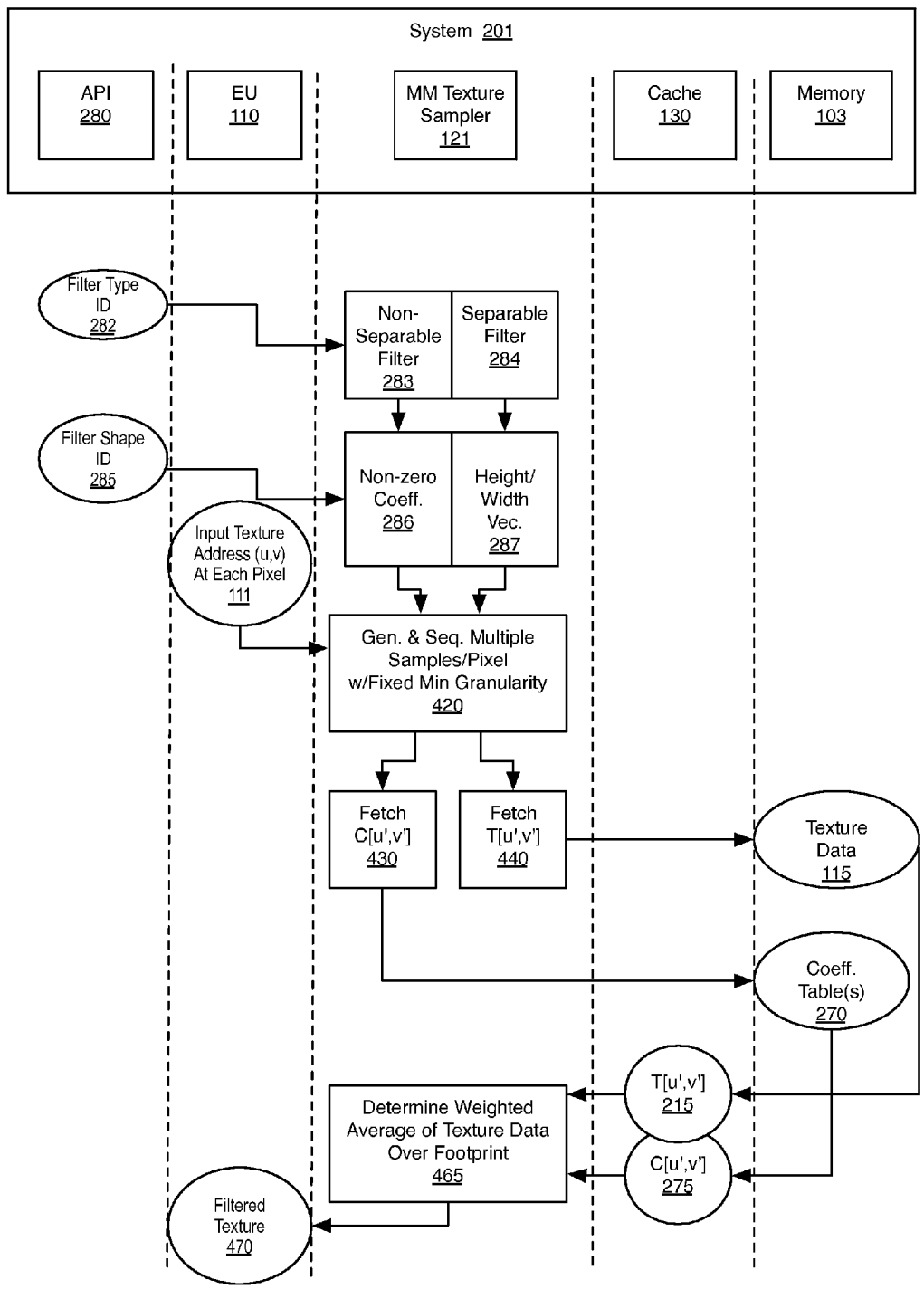
FIG. 3 illustrates how multi-mode flexible texture filtering methods may be performed by a system having an architecture as in FIG. 2, in accordance with embodiments.

FIG. 3 illustrates how multi-mode flexible texture filtering methods may be performed by the system 201 having the architecture as depicted in FIG. 2, in accordance with embodiments. Dotted lines in FIG. 3 demark exemplary functional partitions between the various components of system 201 to illustrate an association between certain actions and particular components of exemplary system 201 responsible for conducting the action. As shown, non-separable or separable filtering modes 283, 284 of the MM texture sampler 121 are specified through API 280 by filter type ID 282. Filter shape may be further parameterized either through a masking of zero value coefficients 286 or with filter shape ID 285 specifying height and width filter vectors 287. Upon receiving a seeding input texture address 111 at each pixel from EU 110, multiple (sub)samples at each pixel are generated and sequenced at operation 420, as described in further detail below. At operation 430, MM texture sampler 121 fetches predetermined filter coefficient values 215 for each generated sub-sample into cache 130, for example from stored coefficient tables 270. At operation 440, MM texture sampler 121 fetches predetermined texel data values 215 for each generated sub-sample into cache 130, for example from stored texture data 115. At operation 465, MM texture sampler 121 determines a weighted average of the color values over the entire footprint, for example by implementing one of the filter functions above, and returns to EU 110 a filtered, sampled texture 470.

Figure 4:
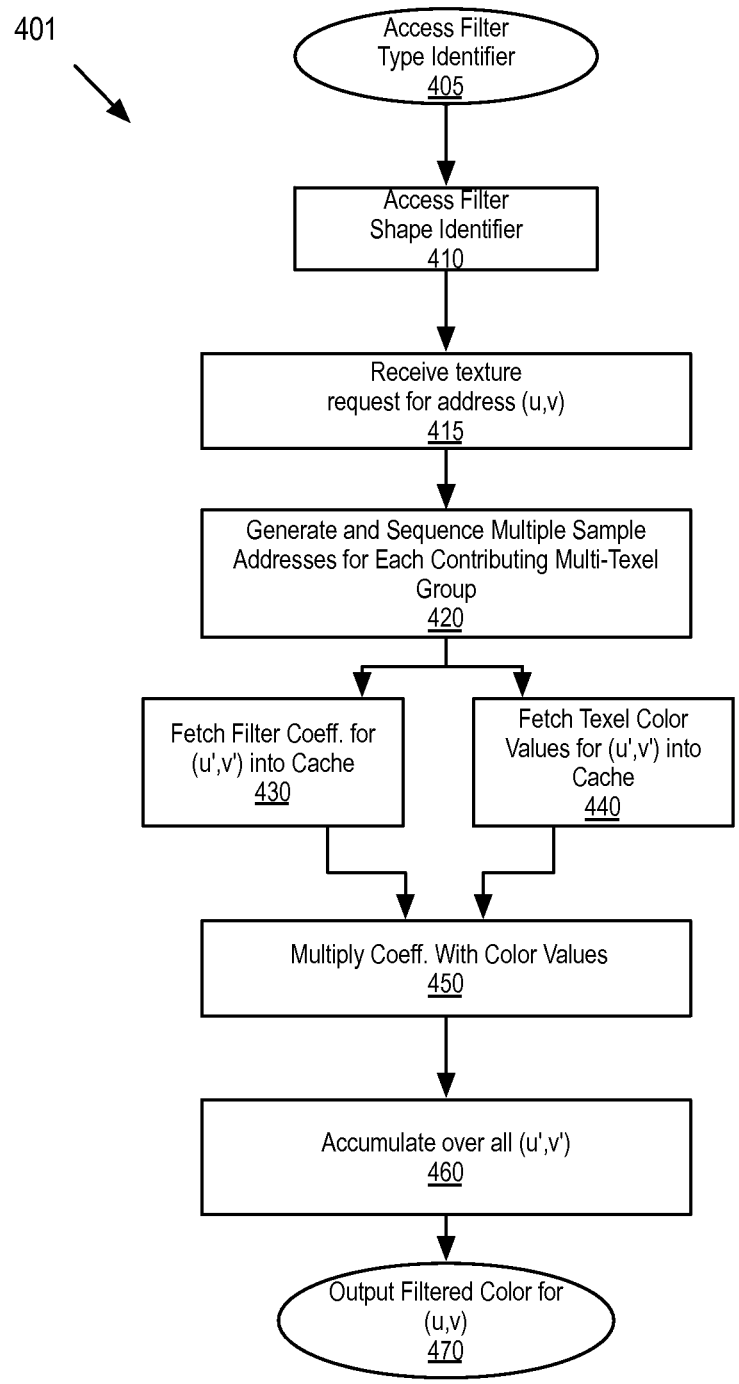
FIG. 4 is a flow diagram illustrating a multi-mode flexible texture filter method, in accordance with embodiments.

Further explanation of an exemplary multi-mode flexible texture filter method 401 is described in the context of FIG. 4. In accordance with the exemplary embodiment, method 401 is performed by the system 201 depicted in FIG. 2. In accordance with other embodiments, a texture sampler having an arbitrary alternative hardware architecture performs method 401. For example, a texture sampler having only one of a separable and non-separable filter mode may nonetheless implement certain aspects of the method 401. In accordance with still other embodiments, a graphics processor having alternate arrangements of logic circuitry and application software may perform method 401. For example, a texture sampler may implement only some of the functions described in the context of FIG. 4 in hardware while other functions are implemented in software. As such, while in one embodiment the method 401 is performed by system 201, system 201 is not required to perform method 401 and system 201 need not perform every operation of method 401.

Method 401 begins at operation 405 with a texture sampler accessing a filter type identifier to determine whether to enter a non-separable filter state or a separable filter state. At operation 410, for either a non-separable or a separable filter, the texture sampler may further access a filter shape identifier to determine the filter footprint parameters. A footprint includes all texels that contribute to a filtered texture value. FIG. 5A illustrates a variety of exemplary footprints that may be "programmed" within the exemplary 8×8 bounding regions, in accordance with embodiments. A large dot in FIG. 5A represents an output texel sample associated with a non-zero filter coefficient that therefore contributes to the particular filtered value, while a small dot is a non-contributing texel associated with a zero-valued coefficient. Notably, because embodiments herein enable designation of a vast number of arbitrary footprints, the eight examples depicted in FIG. 5A do not represent an exclusive listing, but instead are merely to show the great variety of permissible filter shapes and sizes. Filter footprint 520-1 for example has the same size as a conventional bi-linear interpolation filter footprint, while footprint 520-2 is useful for a Gaussian filter. Footprints 520-3, 520-4, and 520-7 are all exemplary anisotropic filter shapes. Footprint 520-5 is useful for a bi-cubic filter), and footprint 520-8 illustrates a maximum 8×8 texel filter.

In the exemplary embodiment, any of a plurality of filter footprints may be defined within a predetermined bounding region. A particular footprint may be associated with a given sampler state, permitting a filter footprint changes with each sampler state change, if desired. The number of different filter footprints possible for a given texture sampler is therefore scalable with the number of filter states that are permissible. FIG. 5B depicts a plurality of footprints 512 that may each be associated with a given state of a multi-mode flexible texture sampler, in accordance with embodiments. For each of footprints 512, there are a fixed number of texels 511 within an 8×8 bounding region (e.g., 510-1, 510-2, 510-N). This dimensionality may vary however as an implementation detail. In one illustrative embodiment, a first filter footprint, suitable for an anisotropic filter, is applied in one filter state, while another footprint suitable for a Gaussian filter is applied in another filter state.

Returning to FIG. 4, upon receiving a texture request at operation 415, for example in the form of a texture address from a shader core, the texture sampler generates a sequence of texel sub-sample addresses (u',v') at operation 420 based on the filter footprint. The filter footprint is applied to the input texture address (u,v) by referencing the sampling positions associated with the footprint to the input texture address. In the exemplary embodiment, the bounding region (e.g., 510-1 in FIG. 5B) is centered at the input texture address (u,v) with output sampling positions then referenced to addresses (u',v'). In embodiments, sub-sample addresses (u',v') are generated for each of a predetermined number of samples associated with a group of neighboring texels that contain at least one contributing texel. This group of neighboring texels represents a minimum granularity for generation of output samples from any given input address and any given footprint. In one embodiment, this minimum granularity is a texel quad, or 2×2 of neighboring texels. FIG. 5C depicts the exemplary texel quad 515 inclusive of texels $T_0$, $T_1$, $T_2$, and $T_3$ represented by a 2×2 of sampling addresses. Embodiments herein leverage the texel quad as an atomic addressing unit advantageous in many respects because of the significant amounts of sampler logic circuitry designed to efficiently utilize pixel locality. For example, values associated with a 2×2 address sequence can be efficiently fetched into a single cache line from memory. Hence, even where a footprint includes only one texel, such as depicted in FIG. 5B, a sequence of four sub-sample addresses (u',v') are generated. For example, in texel quad 515 that contains one contributing texel specified by footprint 520, one sub-sample address for each of texel $T_0$, $T_1$, $T_2$, and $T_3$ is generated for a given input texture address (u,v).

Dashed boxes in FIG. 5A further illustrate exemplary texel quads for each illustrated footprint. For example, footprint 520-2 results in generation of four texel quads: 515-1; 515-2; 515-3; and 515-4. For each quad 515-1 through 515-4, four sub-sample addresses are generated for a total of 16 sub-samples for a given input texture address (u,v). Similarly, footprint 520-3 results in generation of 12 (u',v') sub-sample addresses corresponding to three texel quads. Generation of sub-sample address may proceed over a single or multiple clock cycles. In further embodiments, logic circuitry within the texture sampler (e.g., within the data generator) internally sequences the sub-sample addresses following one or more algorithm to minimize the number of texel quads generated for a given footprint, and/or to maximize coherency of sampling positions, etc. In further advantageous embodiments, the bounding regions (e.g., 510-1, 510-2, 510-N in FIG. 5B) are dimensioned to contain an even multiple of the multi-texel sampling group of minimum granularity. For example, as shown in FIG. 5A, for an 8×8 texel bounding region, footprint 520-8 fills the bounding region and a sequence of 16 texel quads are generated corresponding to 64 output sub-sample addresses (u',v') for an input texture address (u,v) at each pixel.

Notably, any of the footprints depicted in FIG. 5A may be implemented in either separable or non-separable modes of the texture sampler. In the separable filter mode the footprint is defined as the product of two footprints in 1D space. The filter shape identifier may then be indicative of a 1D width vector associated with a first 1D footprint, and a 1D height vector associated with a second 1D footprint, for example. The texture sampler then generates four sub-sample addresses for each texel quad containing at least one texel specified by a first 1D footprint having a first programmable number of texels (e.g., programmable width w) and a second 1D footprint having a second programmable number of texels (e.g., programmable height h). With the predetermined bounding region referenced to the input texture address (u,v), sub-sampling positions specified in the separable filter footprint may be addressed as (u',v').

In the non-separable filter mode where there is one coefficient $C_{xy}$ for each texel within the bounding region, four sub-sample addresses are generated for each texel quad that contains at least one texel having a non-zero coefficient value. In this mode, the filter coefficient table may serve to specify the footprint with the non-zero coefficient values being the only sampling positions contributing to the filter. For such embodiments, all coefficients may be read to generate a sequence of sub-sample addresses. In further embodiments, a sampling mask may be generated from the coefficient table. As one example, 16 bits may specify an 8×8 bounding region, with each bit of the mask indicating one or a few coherent sampling positions (e.g., one 2×2 quad) within the bounding region of the corresponding filter. Notably, with all the sub-sample addresses (u',v') now generated for all multi-texel groupings containing at least one contributing texel, processing of each sub-sample address can efficiently proceed through the filter logic circuitry for each input texture address communicated between shader core and texture sampler.

Returning to FIG. 4, method 401 continues with fetching filter coefficients into the cache. In embodiments, coefficient values are fetched for each texel sub-sample address in a manner dependent on the filter mode. While at least one filter coefficient is needed for each sub-sample address (u',v'), only one filter coefficient $C_{xy}$ is utilized in the non-separable filter mode while two filter coefficients $H_{A,x}$, $V_{B,y}$ are employed in the separable filter mode. Coefficient precision may vary with implementation. For example, 8 bit or 16 bit coefficients may be supported in either separable or non-separable modes. In one exemplary embodiment, multiple levels of precision (e.g., selectable between 8 bit and 16 bit) are supported for a coefficient (e.g., $C_{xy}$). In certain separable mode embodiments, values from two coefficient tables (one for $H_{A,x}$ and one for $V_{B,y}$) are cached for each sub-sample address. Also, in certain non-separable filter mode embodiments, coefficients are accessed based only on the non-fractional portion of the input texture address with any fractional portions of an input texture address ($\beta_u$, $\beta_v$) ignored (e.g., rounded). Hence, non-separable filters may provide texel-level precision. For certain separable filter mode embodiments however, the cached coefficients values are based on (or a function of, or dependent on) the fractional portion of the input texture address. Such embodiments offer sub-texel precision. Further description of such fractional addressing for filter coefficients and other aspects of the separable filter mode are provided further below in the context of FIGS. 6A-6E following discussion of method 401.

Continuing in reference to FIG. 4, a texel color value corresponding to each sub-sample address (u',v') is fetched from memory into the texel data cache at operation 440. Any techniques known in the art may be utilized at operation 440 as embodiments are not limited in this respect. At operation 450 sub-sampled texture data is filtered based on the texel color value and coefficient value associated with each texel sub-sample address. For example, the filter function equation provided above may be implemented with filter logic circuitry that multiplies the filter coefficient (e.g., $C_{xy}$) at each sub-sample address (u',v') with the color value of the corresponding texel ($T_{xy}$) at each sub-sample address (u',v'). The resulting color value for each sub-sample address is then passed to an accumulator, which may also be implemented in the filtering logic circuitry of the sampler. In the accumulator, values are accumulated in each color channel (e.g., R/B/G) over all of the sub-sample addresses (u',v'). The accumulated color is then returned at operation 470 (e.g., to EU 110) as the sampled and filtered color for a pixel, which may also be packed along with filtered colors corresponding to other pixels. While method 401 is generally applicable to both non-separable and separable filter modes, various operations in method 401 (e.g., 420, 430, and 440) are dependent on the filter mode. Additional aspects particular to the separable filter mode are now described in greater detail in the context of FIGS. 6A-6E.

Figure 6A:
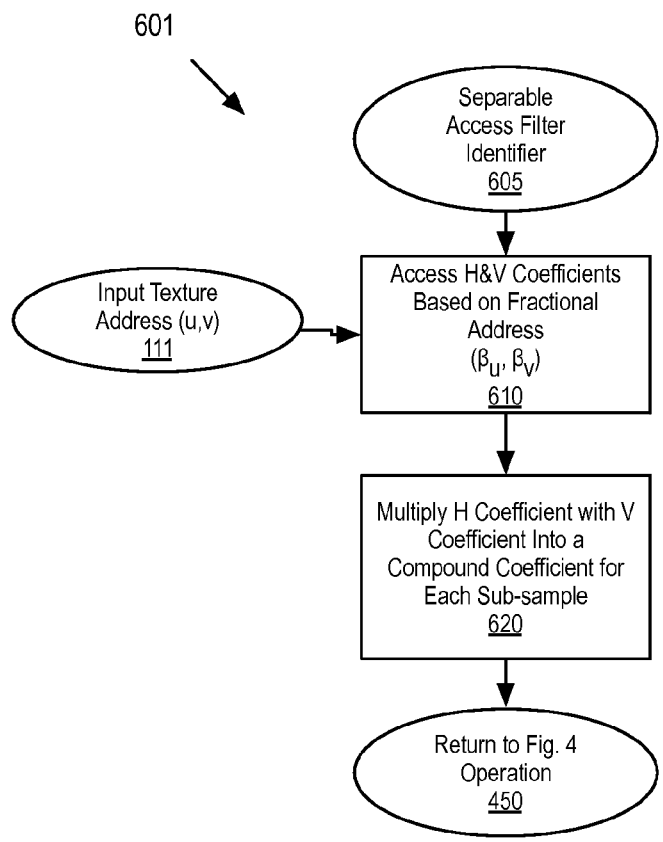
FIG. 6A is a flow diagram illustrating a separable texture filter method that may be implemented as the method depicted in FIG. 4 is performed, in accordance with particular separable filter embodiments.
Figure 6B:
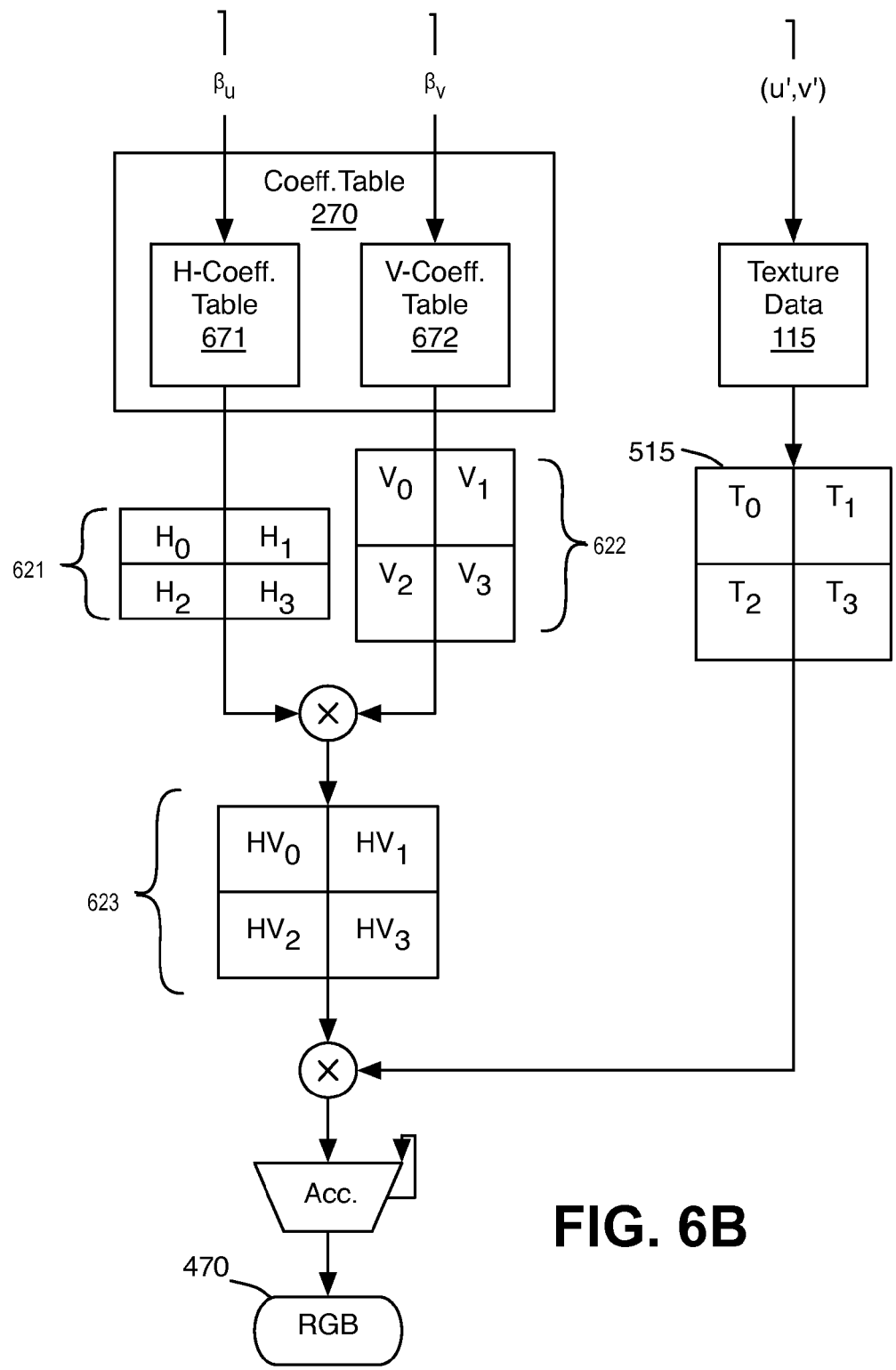
FIG. 6B illustrates a data pipeline as a separable texture filter method is performed by a system having an architecture as in FIG. 2, in accordance with embodiments.
Figure 6E:
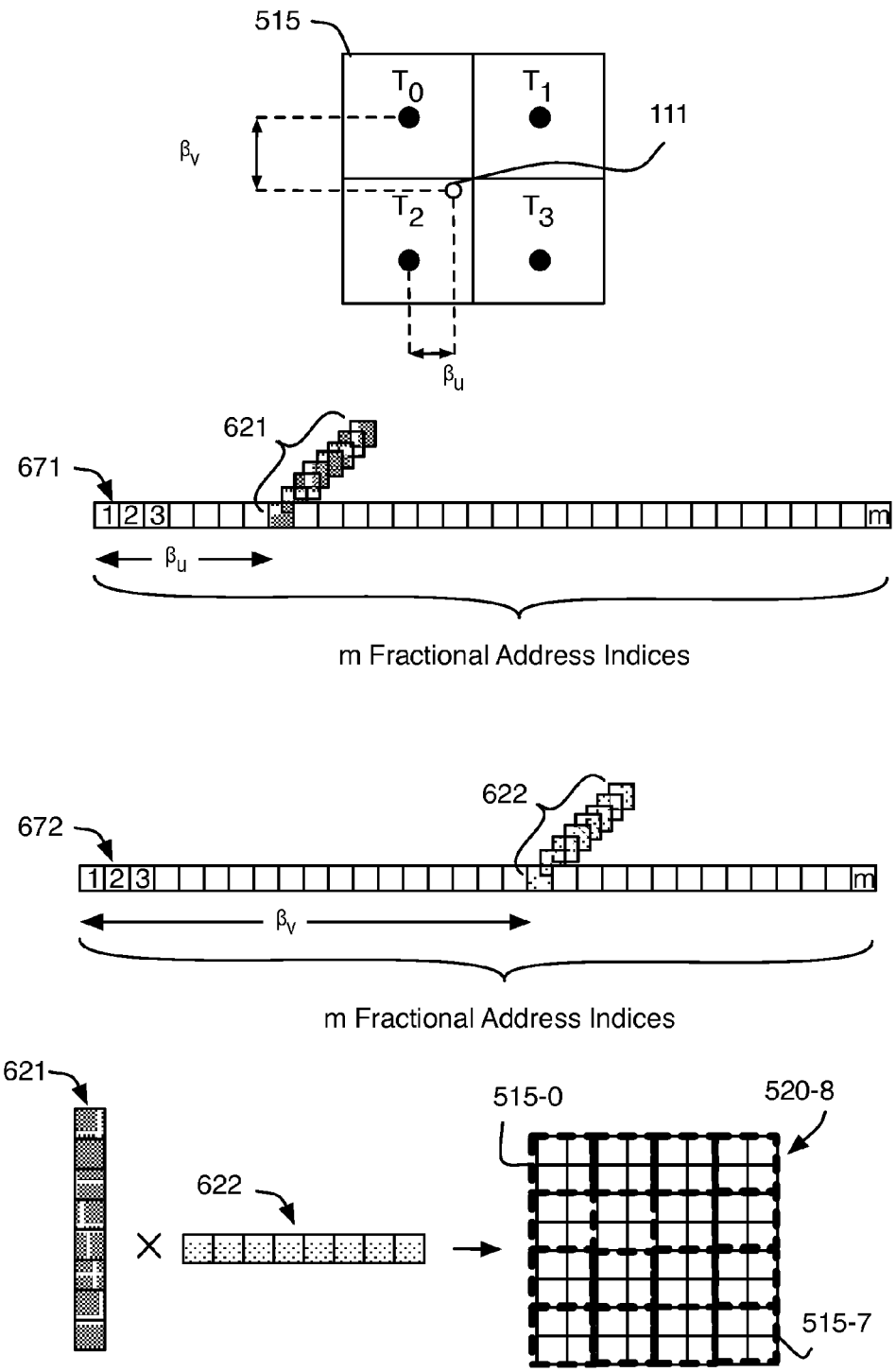
FIG. 6E illustrates a fractional address indexing of filter coefficient tables during execution of the separable filter method in FIG. 6A, in accordance with embodiments.

FIG. 6A is a flow diagram illustrating a separable texture filter method 601 that may be implemented as a portion of operation 430, in accordance with embodiments. Method 601 begins at operation 605 with an indication that the sampler is in the separable filter mode. At operation 610 horizontal and vertical coefficients are chosen from the vertical and horizontal coefficient tables with the fractional portion of the input texture address 111 ($\beta_u$ and $\beta_v$). These fractional address portions are illustrated in FIG. 6E for an input texture address 111 for the exemplary texel quad 515. As further illustrated in FIG. 6B, vertical coefficient table 671 is accessed based on $\beta_v$, and horizontal coefficient table 672 is accessed based on $\beta_u$. In embodiments, each of the coefficient tables 671, 672 have a set of coefficient values for each of a plurality of fractional address values. Each set indexed by a particular fractional address includes a coefficient value for each of the maximum number of texels permitted by the bounding region with non-zero coefficient values corresponding to filter taps. For example, as further depicted in FIGS. 6C and 6D, tables are indexed by fractional address values and each table entry includes 2-8 non-zero coefficients (filter taps $Tap_0$-$Tap_8$). The upper bound on taps is dependent on the size of the bounding region, which is 8×8 texels in the exemplary embodiment. The number of non-zero coefficient values corresponds to the number of contributing texels for that dimension. For example, referring to FIG. 6E, in the horizontal table 671, entries are traversed by $\beta_u$ to choose offset horizontal coefficients. The fractional address may be rounded to the nearest index value and depending on the implementation, various levels of precision may be supported for the fractional address indexing. For example, each table may have 32, 64, 128, or 256 entries, etc. The horizontal coefficients 621 of the corresponding table entry are then accessed. In the depicted example there are a maximum of 8 such coefficients corresponding to an 8 texel wide bounding region. The number of these coefficient values that are non-zero correspond to the number of texels defined by the footprint width w (i.e., number of contributing first filter taps). In the vertical table 672, entries are traversed by $\beta_v$ to choose properly offset vertical coefficients. The vertical coefficients 622 of the corresponding entry are then accessed. In the depicted example there are 8 such coefficients corresponding to an 8 texel tall bounding region. The number of these coefficient values that are non-zero correspond to the number of texels defined by the footprint height h (i.e., number of contributing second filter taps).

Continuing with description of method 601, using the above technique to properly offset horizontal and vertical coefficients, the coefficients are fetched from memory into the coefficient cache following the sequencing of the texel groupings of the minimum granularity that were generated at operation 420. In the exemplary embodiment where this minimum grouping is the texel quad containing 2×2 neighboring texels, four coefficients for each texel quad (e.g., the two horizontal coefficients 621 and the two vertical coefficients 622 and in FIG. 6B) are advantageously fetched from memory into one cache line. A number of such coefficient cache lines may be sequenced over the number of texel quads generated for the specified separable filter footprint (e.g., two cache lines for two texel quads, sixteen cache lines for sixteen quads, etc.). The separable filter equation above may then be implemented with the cached vertical and horizontal coefficient for each sub-sample address multiplied together to form a compound (2D) coefficient at operation 520. This is further illustrated for the exemplary 2×2 texel quad in FIG. 6B where horizontal coefficients $H_0$, $H_1$, are multiplied by vertical coefficients $V_0$ and $V_1$ to arrive at compound coefficients $HV_0$ and $HV_1$. Horizontal coefficients $H_2$ and $H_3$ are each similarly multiplied by vertical coefficients $V_2$ and $V_3$ to arrive at compound coefficients $HV_2$ and $HV_3$. At this point, method 601 can return to operation 450 in method 401 where the cached lines of filter coefficients are the compound coefficients output from method 601. Operations 450 and 460 of method 401 then proceed as further exemplified in FIG. 6B where the compound filter coefficients 623 are then multiplied with the texel color values $T_0$, $T_1$, $T_2$, and $T_3$ for the corresponding quad 515 of sub-sample addresses (which may be similarly stored in a single cache line). The resulting weighted texel color values are then accumulated over all sub-sample addresses sequenced for the separable footprint to arrive at the filtered color value output from the texture sampler at operation 470.

Multi-Mode Filter Logic Unit

Further description of a multi-mode filter logic unit configurable for a weighted averaging of texel colors in addition to bilinear filtering is now provided in the context of FIGS. 7A-10. Such multi-mode filter logic unit has flexibility to support the multiple sampler modes described above for weighted averaging over any particular filter footprint and also perform efficient bilinear interpolation, as needed. For the sake of clarity, configurable filter architectures and multi-mode filtering methods are described in the context of MM FL unit 132 depicted in FIG. 2. Although one or more of these features so described may be advantageously incorporated into MM FL unit 132, it is noted that one or more of these features may be incorporated into a graphics processing system in a number of alternative manners. As such, one or more features found in filter logic unit embodiments may be implemented without one or more of the features described above in the context of a multi-mode sampler. For example, one or more multi-mode filter logic embodiments do not require a flexible footprint mode, just as one or more multi-mode sampler supporting a flexible footprint does not require multi-mode filter logic. Nevertheless, embodiments incorporating a multi-mode sampler supporting a flexible footprint mode with a multi-mode filter logic unit have a synergy that will be clear to one of ordinary skill.

Figure 7A:
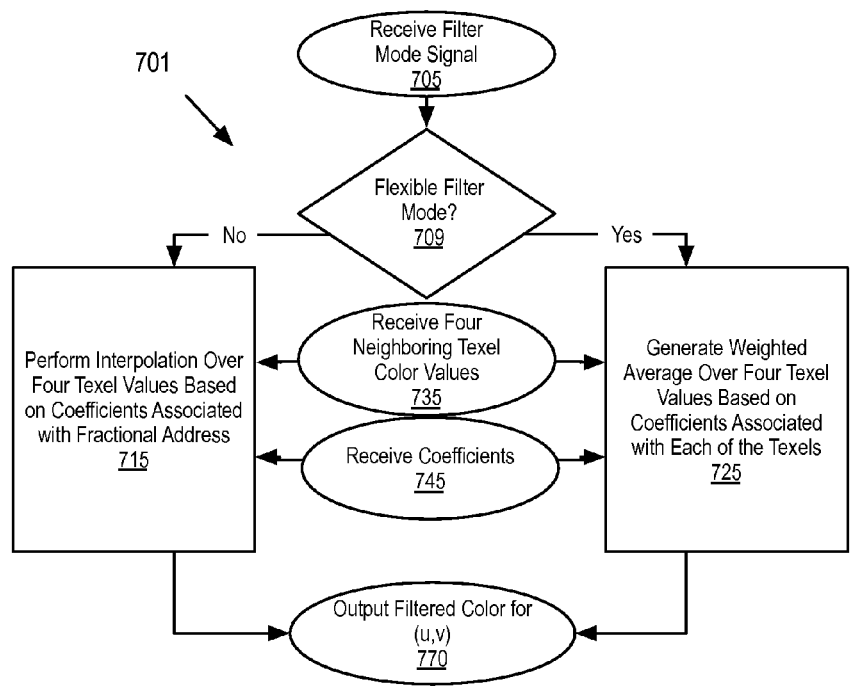
FIG. 7A is a flow diagram illustrating a multi-mode filtering method, in accordance with an embodiment.

In embodiments, a graphics processing system includes a configurable, or "flexible" texture filter suitable for implementing a multi-mode filtering method. FIG. 7A is a flow diagram illustrating a multi-mode filtering method 701, in accordance with an embodiment. Method 701 begins with receiving a filter mode signal at operation 705. The filter mode signal at least differentiates between a "bilinear filter" mode and a "flexible filter" mode. In the bilinear filter mode, texel data (e.g., color values) is weighted at operation 715 with a bilinear filter using the sub-texel (fractional) address to arrive at a filtered color output at operation 770. In the flexible filter mode, texel data is weighted at operation 725 based on predetermined texel weighting coefficient values that may or may not be dependent on the sub-texel (fractional) address. For example, in a non-separable filter mode as described above, the coefficients received at operation 745 in the flexible filter mode are independent of the fractional address while the coefficients have a sub-texel dependence in the separable filter mode.

In response to determining the mode signal is indicative of the bilinear filter mode at operation 709, method 701 proceeds to operation 715 where filter logic performs the bilinear interpolation (i.e., "bilerp") over four texel values received at operation 735. For the exemplary embodiment where a single 2×2 texel quad was sub-sampled based on the texture address (e.g., equivalent to quad 515-1 for footprint 520-1 in FIG. 5A), a single cache line read includes these four neighboring texel values. The bilerp is performed using coefficients that are indicative of the fractional texture address: $\beta_u$ and $\beta_v$, which are received at operation 745.

In response to determining the mode signal is indicative of the flexible filter mode at operation 709, method 701 proceeds to operation 725 where the filter logic generates a weighted average over at least four texel values received at operation 735. For the exemplary embodiment where a number of 2×2 texel quads were sub-sampled as (u',v') based on the texture address and footprint (e.g., any of the footprints 520-1 through 520-8 depicted in FIG. 5A), a single cache line read may include the four neighboring texel values. The weighted average over one texel quad is generated using four predetermined weighting coefficients, each coefficient being indicative of a weighting associated with the corresponding texel in the quad. Upon arriving at the filtered color at operation 770, method 701 is complete and the weighted average color may be then returned to an accumulator (e.g., accumulator 298 in FIG. 2) for further averaging over a plurality of texel quads mapped to the filter footprint and/or returned to a shader core (e.g., EU 110 in FIG. 2) for subsequent output of a graphical object to a display screen.

Figure 7B:
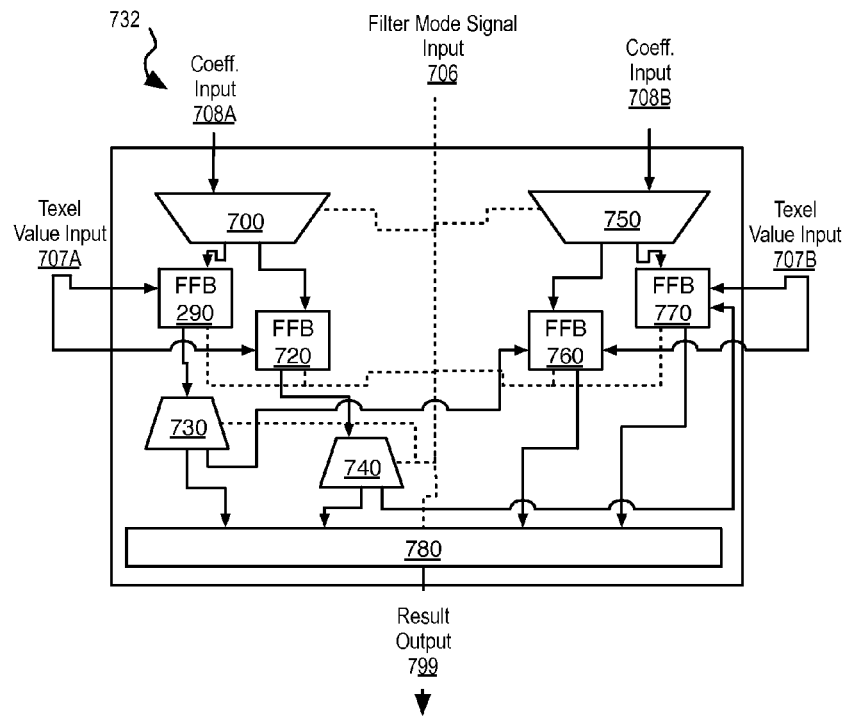
FIG. 7B is a block diagram of a filter logic unit configured to perform the multi-mode filtering method depicted in FIG. 7A, in accordance with embodiments.

FIG. 7B is a block diagram of a filter logic unit 732 configured to perform the multi-mode filtering method 701, in accordance with embodiments. In one advantageous embodiment, filter logic unit 732 is utilized as filter logic unit 132 depicted in FIG. 2. As shown, filter logic unit 732 is coupled to filter mode input line(s) 706. The filter logic unit 732 is further coupled to texel value input line(s) 707A and coefficient input line 708A. Although these input lines are illustrated as separate for the sake of clearly demarking the various system inputs, one or more of the input signal lines may be multiplexed in any conventional manner for conveyance of these various data signals into filter logic unit 732.

The logic circuitry of filter logic unit 732 further includes at least a pair of flexible filter blocks (FFB) that are coupled to the filter mode signal input 706 and operable in a plurality of modes selectable by the filter mode signal. In one exemplary embodiment, each FFB is configurable to perform a portion of the bilerp or similarly perform a portion of the flexible weighted averaging over a texel quad. As described further below, with circuitry of an FFB responsible for only a portion of a given one of the multiple filtering functions, each FFB may advantageously include the same circuitry and so represent a scalable filter logic block that is fully utilized regardless of the filtering mode. Such a microarchitecture design makes efficient use of chip area and reduces power consumption. In the exemplary microarchitecture, the filtering is apportioned between two FFB such that circuitry represented by a pair of FFB is operable in a first mode to perform the bilinear interpolation over the group of four neighboring texel values based on two input coefficients indicative of a fractional address associated with the four texels read in for a given input address. Similarly, circuitry represented by a pair of FFB is also operable in a second mode to generate the weighted average over the group of four neighboring texel values based on four coefficients, each indicative of a weighting associated with one of four texel values read in for a given filter footprint. Averaging over four texels may be then further accumulated over the footprint, for example by accumulator 298 in FIG. 2.

In the exemplary embodiment depicted in FIG. 7B, filter logic unit 732 includes four FFB, 290, 720, 760, and 770. Responsive to the filter mode signal, circuitry represented by FFB 290 and FFB 760 is operable in a first mode to perform the bilinear interpolation over a group of four neighboring texel values received at texel value input line 707A using coefficients received from coefficient input line 708A. Circuitry represented by the FFB 290 and 720 is operable in a second mode to generate the weighted average over the group of four neighboring texel values from input line 707A using coefficients received from input line 708A. In this exemplary embodiment, an FFB pair is staged in the bilinear filter mode with the bilerp serialized into a horizontal phase handled by one FFB and a vertical phase handled by the second FFB. In the flexible filter mode, FFB pairs are not so staged, but rather each FFB instead generates a weighted average over two of the four texels in parallel. The weighted average is then accumulated to arrive at a weighted average of one four texel quad. With this microarchitecture, multiplexer 700 distributes coefficients received on input line 708A to each of FFB 290 and 720. In the bilinear filter mode, the coefficients are associated with a first dimension of a fractional address (e.g., $\beta_u$). Multiplexer 750 similarly distributes coefficients associated with the second dimension of the fractional address (e.g., $\beta_v$) from coefficient input line 708B. Coefficients based on $\beta_v$ are output to FFB 760 for use in the second phase of the staged bilerp filtering.

In embodiments, a selector is coupled between a pair of filter logic blocks to selectively stage two flexible filter blocks. The selector may either pass output from an upstream filter block to a downstream filter block, or to an output stage responsible for further processing, such as accumulation. In the exemplary embodiment depicted in FIG. 7B, output from FFB 290 is passed to selector 730. Selector 730 is further coupled to filter mode signal input 706 and, in response to a bilinear filter mode signal, passes output from FFB 290 to an input of FFB 760. Similarly, output from FFB 720 is coupled to selector 740, which like selector 730, is further coupled to filter mode signal input 706. In response to a bilinear filter mode signal, selector 740 passes output from FFB 720 to an input of FFB 770. FFB 760 is coupled to output stage 780 and outputs a result of the second phase of the staged bilerp filtering based the $\beta_u$ coefficient received from multiplexer 750 for a first texel quad. FFB 770 similarly provides to output stage 780 results of the second phase of the staged bilerp filtering with the $\beta_v$ coefficient received from multiplexer 750 for a second texel quad.

Alternatively, in response to a flexible filter mode signal, selectors 730, 740 pass output from FFB 290, 720, respectively, to output stage 780. Likewise, in response to a flexible filter mode signal, FFB 760 and 770 receive texel values for a second texel quad through texel value input line 707B, which are processed using weighting coefficients received from coefficient signal input line 708B, and passed to output stage 780. Output stage 780 is further coupled to filter mode signal input line 706. Responsive to the filter mode signal, output stage 780 may pass signals received from selector 730, and/or 740, and/or FFB 720, and/or FFB 760, and/or FFB 770, accumulate any of these received signals, and/or normalize one or more these received signals, and/or interpolate between a plurality of these received signals. Output stage 780 is further coupled to output signal line 799 over which the result from flexible filter logic unit 732 is conveyed to an external destination.

With the multi-mode filtering method and architecture of flexible filter logic unit 732 as described above, aspects of the method and architecture are described below in further detail in the context of the bilinear filter mode in FIGS. 8A, 8B and, 8C, and in the context of the flexible filter mode in FIGS. 9A, 9B.

Figure 8A:
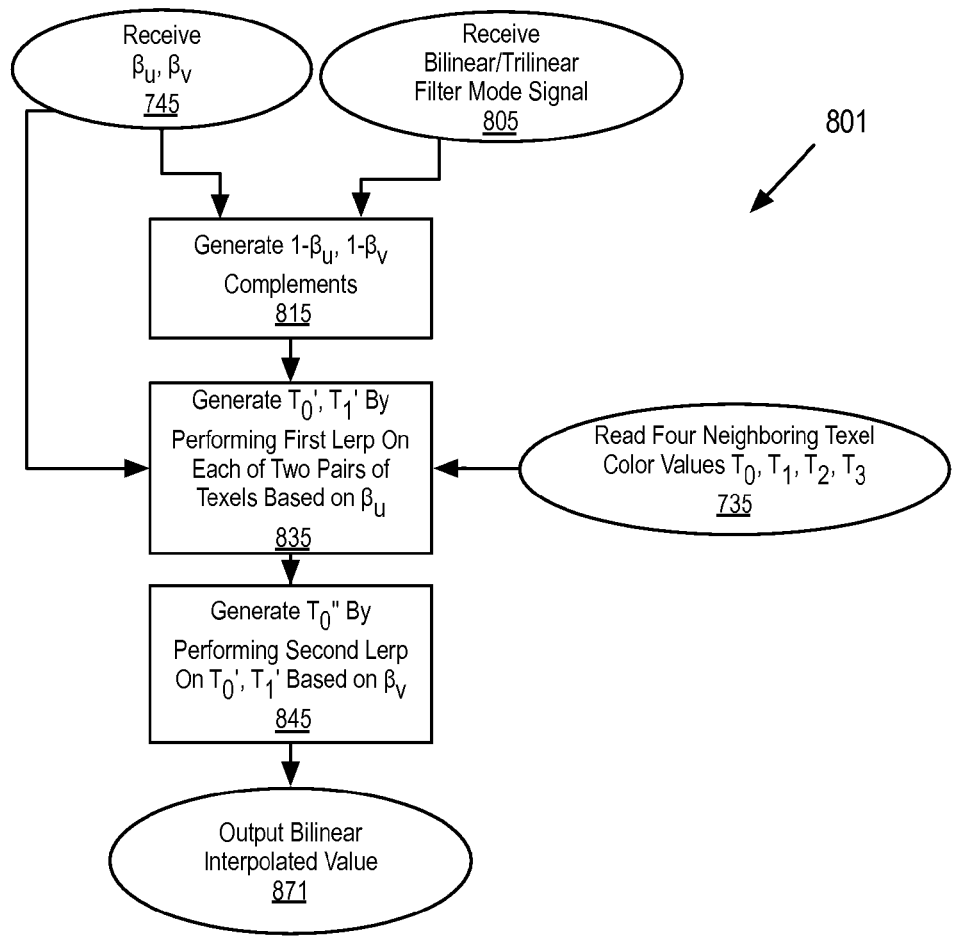
FIG. 8A is a flow diagram illustrating a bilinear filtering method that may be performed as part of the multi-mode filtering method depicted in FIG. 7A, in accordance with embodiments.

FIG. 8A is a flow diagram illustrating a bilinear filtering method 801 that may be performed as part of the multi-mode filtering method 701 depicted in FIG. 7A, in accordance with embodiments. Method 801 begins with receiving a bilinear filter mode signal at operation 805. Such a signal may further be utilized for a trilinear filter mode where the bilinear mode operations are followed with an additional interpolation stage between texels associated with different levels of detail (LOD). In method 801, the coefficients received as inputs at operation 745 are the $\beta_u$ and $\beta_v$ values associated with a predetermined fractional address. At operation 815, complements of the coefficients ($1-\beta_U$ and $1-\beta_v$) are generated. A first lerp (e.g., horizontal) is performed to generate a pair of linear interpolated values $T_0'$, $T_1'$ at operation 835. $T_0'$, $T_1'$ are generated from one dimension of the fractional address and four texel values (e.g., colors) $T_0$, $T_1$, $T_2$, and $T_3$ for the nearest neighboring texel quad associated with the texture address read in from memory (e.g., in one cache line) at operation 735. A first linear interpolated value, $T_0'$ is generated for a first pair of the texels by multiplying a first texel value of the first pair with a first coefficient corresponding to the fractional address. A second texel of the first pair is multiplied with the complement of the first coefficient. A second linear interpolated value $T_1'$ is generated for a second pair of the texels by multiplying the first coefficient with a third texel value associated with the second pair. A fourth texel value associated with the second pair is multiplied with the complement of the first coefficient. These scaled values are then summed. In the exemplary embodiment, the interpolated values $T_0'$, $T_1'$ are generated, one for each of two pairs based on $\beta_u$, by implementing the functions:

$$0=0+(1-)1;$$

$$1=2+(1-)3.$$

Alternatively, an interpolation may be performed at operation 835 based on $\beta_v$, and the texel value pairs $T_0$, $T_2$. and $T_1$, $T_3$. Method 801 then proceeds to operation 845 where a second lerp is performed to generate a bilinear interpolated value $T_0'''$, for the example above further implementing the function:

$$0=0+(1-)1.$$

Method 801 then completes with output of the bilinear interpolated value 0 or as the filtered result.

Figure 8B:
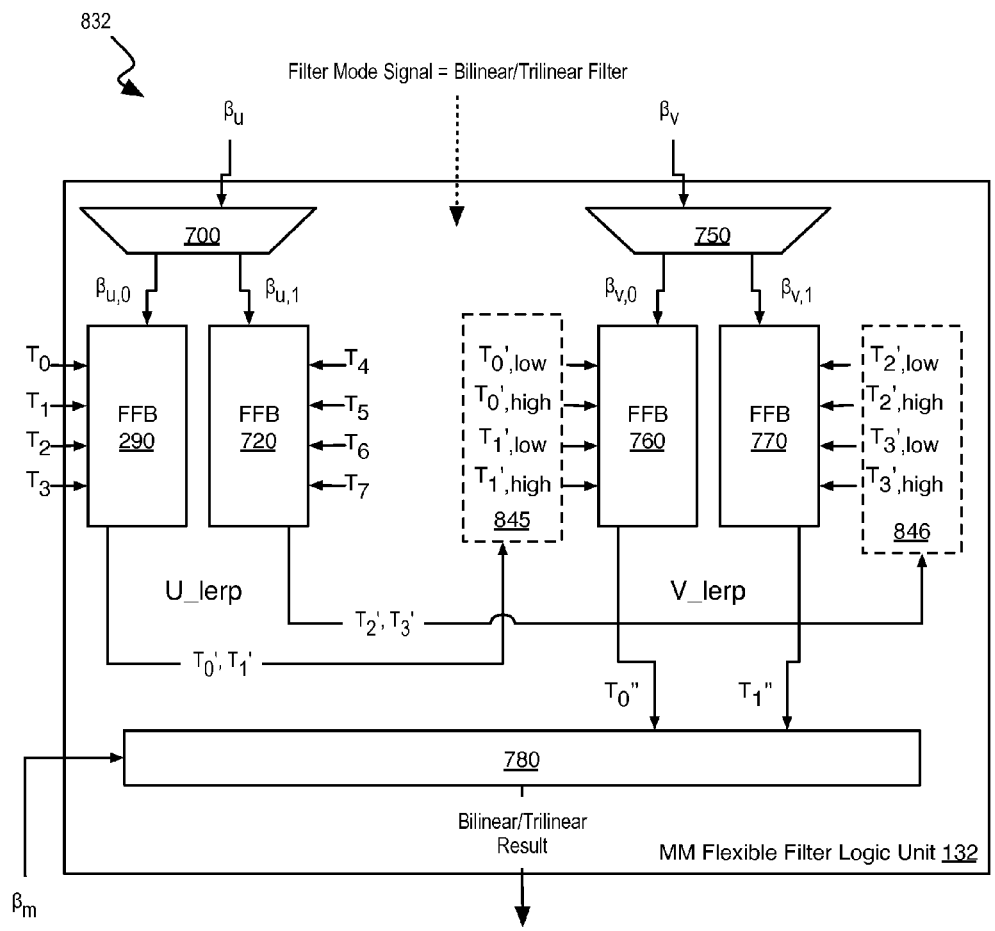
FIG. 8B is a block diagram of a filter logic unit configured into a bilinear filter mode, in accordance with embodiments.

FIG. 8B depicts a block diagram of a filter logic unit 832 configured into a bilinear filter mode, in accordance with embodiments. In the exemplary embodiment, filter unit 832 is filter logic unit 732 of FIG. 7B in a state associated with a filter mode signal indicative of a bilinear and/or trilinear filter mode. Reference numbers introduced in FIG. 7B are retained in FIG. 8B for the sake of clarity. In alternative embodiments however, filter logic unit 832 may not include all components depicted in filter logic unit 732.

In the exemplary embodiment depicted in FIG. 8B, each flexible filter block 290, 720, 760 and 770 is to generate a pair of linear interpolated values from four texel values and one dimension of a fractional address. Multiplexer 700 is communicatively coupled to a coefficient memory storing an input texture address (u,v). A coefficient associated with one texture address is read in and output as $\beta_{u,0}$ to FFB 290. FFB 290 is communicatively coupled to a texel memory, such as texel cache 215 in FIG. 2, and reads in texel values $T_0$, $T_1$, $T_2$, and $T_3$ for a nearest neighboring texel quad associated with a first texture address. FFB 290 performs the first lerp (e.g., horizontal) to generate the pair of linear interpolated values $T_0'$ and $T_1'$. FFB 720 is communicatively coupled to the texel memory, and reads in texel values $T_4$, $T_5$, $T_6$, and $T_7$ for the nearest neighboring texel quad associated with a second texture address. FFB 720 performs another first lerp to generate another pair of linear interpolated values $T_2'$, $T_3'$ for example by applying the equations above to the second texel quad.

FFB 290 is communicatively coupled to FFB 760 (e.g., by selector 730 shown in FIG. 7B) with FFB 720 similarly coupled to FFB 770. In the exemplary embodiment, the second lerp performed by FFB 760 (FFB 770) is performed on interpolated values $T_0'$ and $T_1'$ ($T_2'$, $T_3'$) that are split into high and low bit portions (e.g., $T_0'_{,high}$, $T_1'_{,high}$ and $T_0'_{,low}$, $T_1'_{,low}$ or $T_2'_{,high}$, $T_3'_{,high}$ and $T_2'_{,low}$, $T_3'_{,low}$). Splitting the interpolated values from the first lerp phase is advantageous for at least the reason that FFB 290, 720, 760, and 770 may then all utilize logic of the same bit-width (e.g. 8-bit) and the number of texel value inputs is the same, permitting the same microarchitecture within each FFB. Where 8-bit logic is employed in the FFB 290 and 760, each texel value $T_0$, $T_1$, $T_2$, $T_3$ and $\beta_{u,0}$ has an 8-bit representation and the interpolated values $T_0'$ and $T_1'$ have 16-bit representations, and likewise for $T_2'$, $T_3'$. Convertor 845 converts the wide-bit lerp values into high bit portions ($T_0'_{,high}$, $T_1'_{,high}$) and low bit portions ($T_0'_{,low}$, $T_1'_{,low}$), each of these being, for example, 8-bit representations. Output of convertor 845 is communicatively coupled to input of FFB 760. This architecture is replicated with convertor 846 and FFB 770. FFB 760 and 770 are also communicatively coupled to multiplexer 700, which is further communicatively coupled to a coefficient memory from which a second coefficient associated with a texture address is read in and output as $\beta_{v,0}$ to FFB 760. Similarly coefficient $\beta_{v,1}$ is output to FFB 770. FFB 760, 700 are then to perform a second lerp (e.g., vertical lerp) to generate the bilinear interpolated value $T_0''$ and $T_1''$, respectively. Output stage 780 may either output the bilinear interpolated values $T_0''$ and $T_1''$ as bilinear filtered results, or in response to a trilinear mode signal, perform a further interpolation between $T_0''$ and $T_1''$ based on a coefficient $\beta_m$, for example using any conventional technique for scaling bilerp values between two LOD.

Figure 8C:
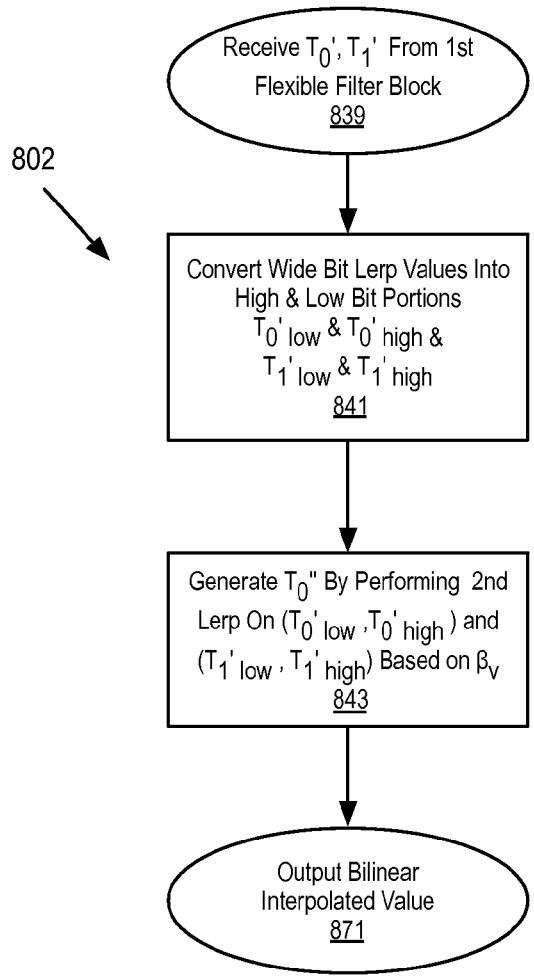
FIG. 8C is a flow diagram illustrating the bilinear filtering method depicted in FIG. 8A as more specifically performed by the filter logic unit depicted in FIG. 8B, in accordance with embodiments.

FIG. 8C further illustrates the second lerp method 802 performed by the filter logic unit 832. The second pair of FFB stages, 720, 770 may perform this same method. Method 802 begins with receiving $T_0'$, $T_1'$ from the first FFB at operation 839. The received wide-bit lerp values are then converted into the high and low bit portions at operation 841. At operation 843, the bilinear interpolated value $T_0''$ is generated with the full bit width (e.g., 16-bit) by assembling a third linear interpolated value (generated based on $\beta_{v,0}$ and the low bit portions $T_0'_{,low}$, $T_1'_{,low}$, and a fourth linear interpolated value (generated based on $\beta_{v,0}$ and the high bit portions $T_0'_{,high}$, $T_1'_{,high}$. Expanding the second lerp equation above for example, $T_0''$ may be generated at operation 843 by implementing the function:

$$0=\beta,00,+(1-\beta_{v,0})1+(v,00,hh+(1-v,0)1,hh)*256,$$

where the multiplier 256 shifts the high bits left by eight positions (a carry bit may also be utilized, etc.). Method 802 then completes at operation 871 with output of the bilinear interpolated value $T_0''$.

Figure 9A:
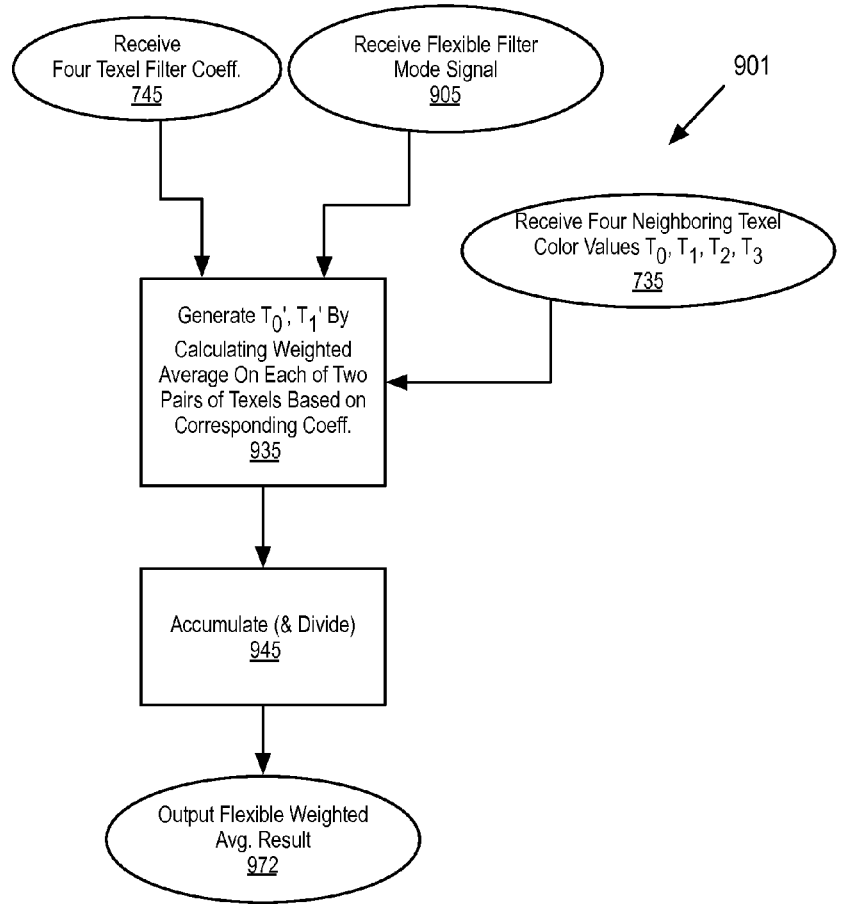
FIG. 9A is a flow diagram illustrating a flexible filtering method that may be performed as part of the multi-mode filtering method depicted in FIG. 7A, in accordance with embodiments.

FIG. 9A is a flow diagram illustrating a flexible filtering method that may be performed as part of the multi-mode filtering method depicted in FIG. 7A, in accordance with embodiments. Method 901 begins with receiving a flexible filter mode signal at operation 905. In method 901, the coefficients received as inputs at operation 745 are each indicative of the weighting associated with one of the four texel values $T_0$, $T_1$, $T_2$, $T_3$ received at operation 735. At operation 935 a first of the texel values is scaled by a first coefficient to generate a weighted value that is added to a second of the texel values scaled by a second coefficient, for example following the equation:

0'=0 0+2 2.

Third and fourth texel values are similarly weighted following the equation:

1'=1 1+3 3.

At operation 945, these weighted texel pairs are then accumulated (summed) at operation 945 to arrive at a weighted average for one texel quad. In further embodiments, the accumulated value may be divided by a normalization factor. The method 901 then completes at operation 972 with output of the flexible weighted average, for example to the accumulator 298 in FIG. 2.

Figure 9B:
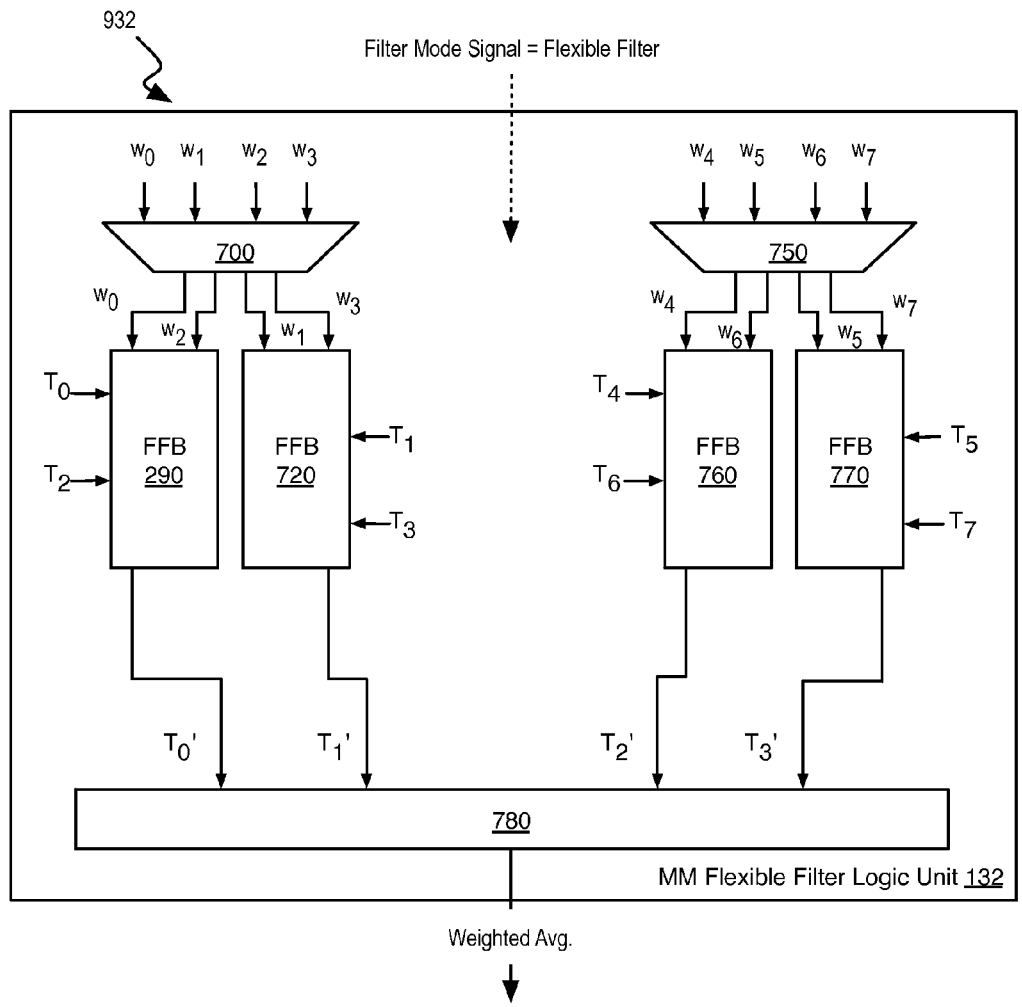
FIG. 9B is a block diagram of a filter logic unit configured into a flexible filter mode, in accordance with embodiments.

FIG. 9B is a block diagram of a filter logic unit configured into a flexible filter mode, in accordance with embodiments. In the exemplary embodiment, filter unit 932 is filter logic unit 732 of FIG. 7B in a state associated with a filter mode signal indicative of a flexible filter mode. Reference numbers introduced in FIG. 7B are retained in FIG. 9B for the sake of clarity. In alternative embodiments however, filter logic unit 932 may not include all of the components present in filter logic unit 732.

In the exemplary embodiment depicted in FIG. 9B, each flexible filter block 290, 720, 760 and 770 is to generate a sum of a first and second of the texel values with the first texel value scaled by a first coefficient, and the second texel value scaled by a second coefficient. Multiplexer 700 is communicatively coupled to a coefficient memory, such as a coefficient cache, from which four coefficients $w_0$, $w_1$, $w_2$, and $w_3$ associated with one texture address is read in with $w_0$ $w_2$ output to FFB 290 and $w_1$, $w_3$ output to FFB 720. FFB 290 is communicatively coupled to a texel memory, such as texel cache 215 in FIG. 2, and receives texel values $T_0$ and $T_2$ for the nearest neighboring texel quad associated with a first texture address. FFB 720 is similarly coupled to receive texel values $T_1$ and $T_3$ for the first texture address. Implementing the flexible weighting function above, FFB 290 generates $T_0'$ as the sum of a first texel value $T_0$ scaled by a first coefficient $w_0$ and a second texel value $T_2$ scaled by a second coefficient $w_2$. FFB 720 likewise generates $T_1'$ as the sum of a first texel value $T_1$ scaled by a first coefficient $w_1$ and a second texel value $T_3$ scaled by a second coefficient $w_3$. FFB 290 and 720 are communicatively coupled to output stage 780. Output stage 780 then operates as an accumulator to add the sums $T_0'$ and $T_1'$ which are output from filter logic 932 as a weighted sum for one texel quad to the one or more output signal line. FFB 760 and 770 may similarly output weighted sums $T_2'$ and $T_3'$ for another texel quad, which may be further accumulated with the sum of $T_0'$ and $T_1'$ in output stage 780.

Figure 10A:
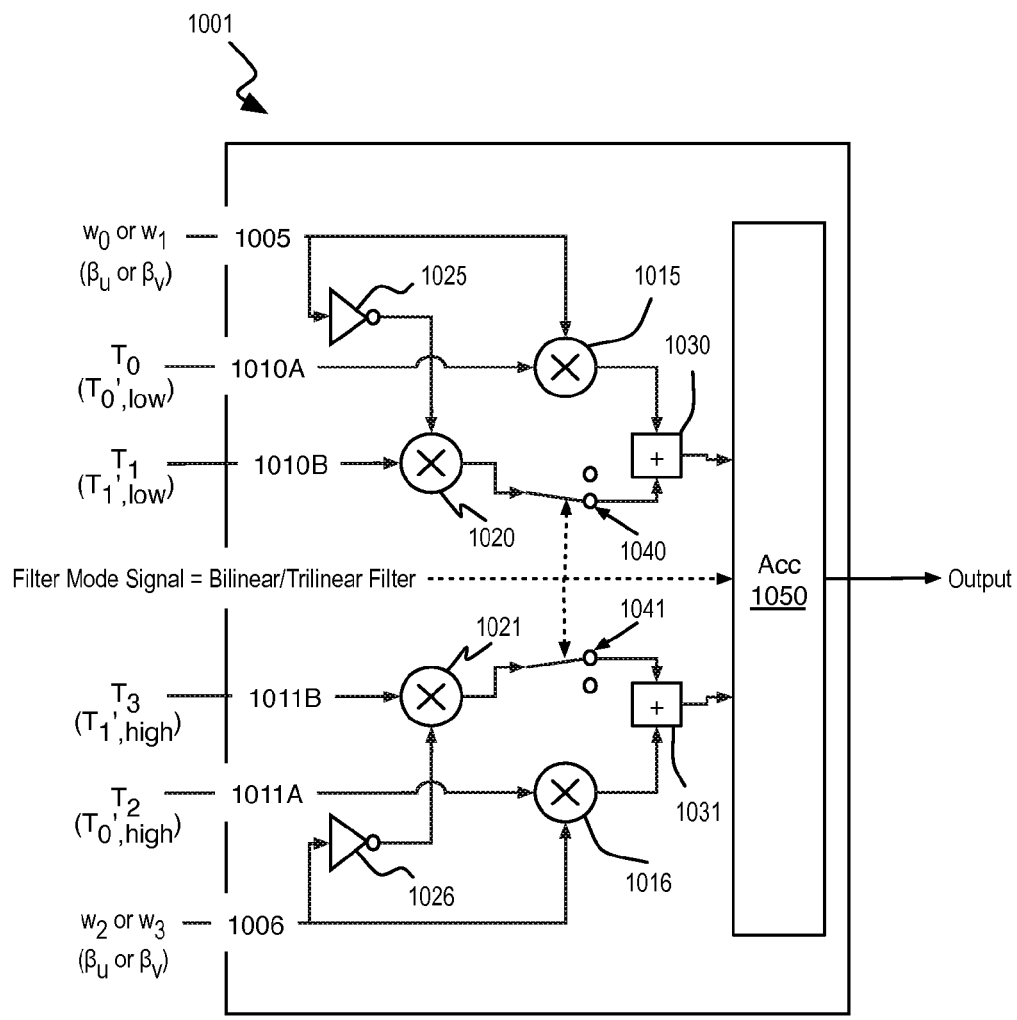
FIG. 10A is a block diagram of a flexible filter block configured into a bilinear filter mode, in accordance with embodiments.
Figure 10B:
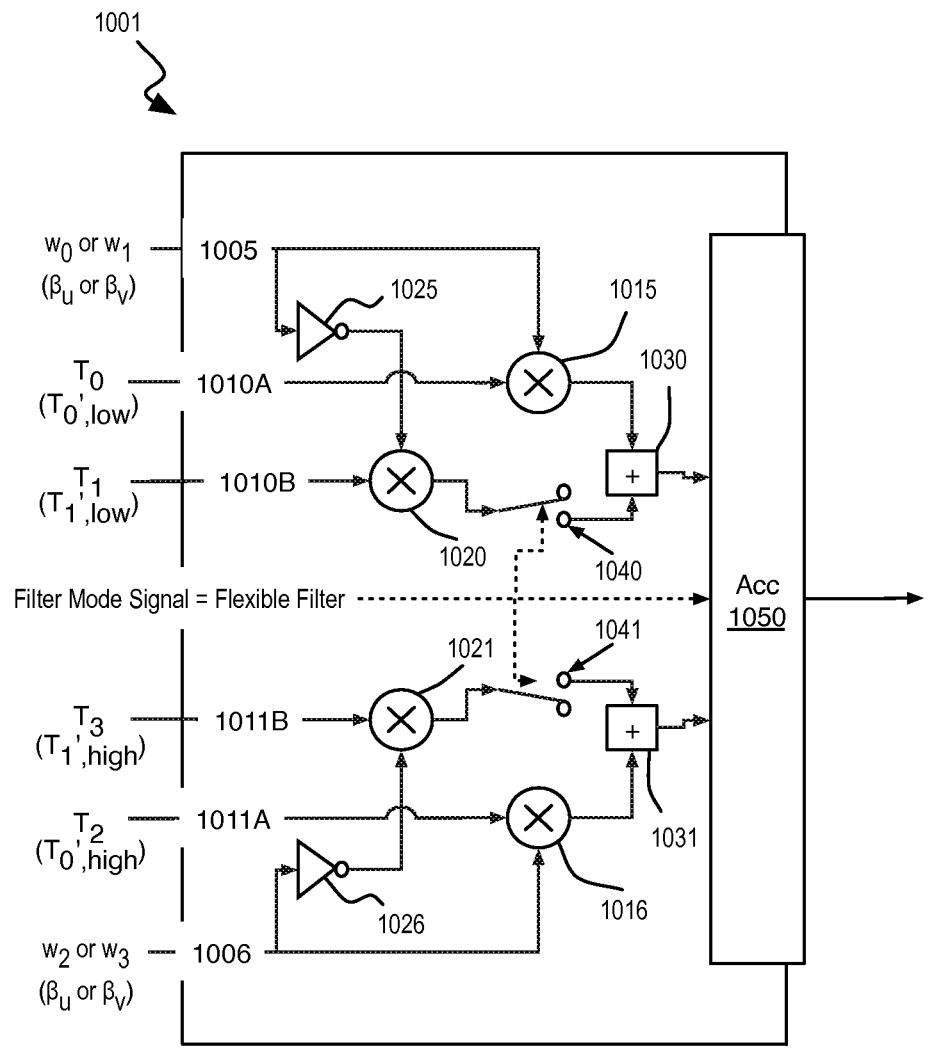
FIG. 10B is a block diagram of the flexible filter block in FIG. 9B configured in a flexible filter mode, in accordance with embodiments.

With the multi-mode operation of the plurality of flexible filter blocks described above, a more detailed description of the microarchitecture of one flexible filter block is described below in the context of FIGS. 10A-10B. FIG. 10A is a block diagram of a flexible filter block in a filter logic unit configured into a bilinear filter mode, in accordance with embodiments. FIG. 10B is a block diagram of the flexible filter block of FIG. 10A configured in a flexible filter mode, in accordance with embodiments.

Referring first to FIG. 10A, flexible filter block (FFB) 1001 illustrates an exemplary microarchitecture in one embodiment that is utilized by each FFB illustrated in any of the filter logic units depicted in FIG. 7B, 8B, or 9B. In other embodiments, however, flexible filter block 1001 may be incorporated into alternatively designed filter logic units. FFB 1001 illustrates circuitry in a state associated with a filter mode signal indicative of a bilinear (trilinear) filter mode. FFB 1001 includes a coefficient input 1005 to receive a coefficient associated with either a predetermined fractional address (e.g., $\beta_u$ or $\beta_v$) or a predetermined texel weighting coefficient (e.g., $w_0$ or $w_1$). In the bilinear filter mode, this coefficient is $\beta_u$, for example. FFB 1001 further includes two texel value inputs 1010A, 1010B, each to receive a texel color value. A first multiplier 1015 has a first input coupled to the coefficient input 1005 and a second input coupled to texel value input 1010A. A second multiplier 1020 has a first input coupled to the first coefficient input 1005 through an invertor 1025 and a second input coupled to the second texel value input 1010B. An adder 1030 is coupled to an output of first multiplier 1015 and an output of second multiplier 1020. The coupling between multiplier 1020 and adder 1030 is through a switch 1040 that is responsive to the filter mode signal. In the bilinear mode, switch 1040 is closed to pass a texel value (e.g., $T_1$) as scaled by the complement of $\beta_u$ or $\beta_v$, which is added to the product of another texel value (e.g., $T_0$) as scaled by $\beta_u$ or $\beta_v$, to generate the first interpolated value (e.g., $T_0'$). This logic is replicated within the filter block 1001 by inputs 1006, 1011A, and 1011B, multipliers 1016, 1021, invertor 1026, adder 1031, and switch 1041 to generate the second interpolated value (e.g., $T_1'$), thereby implementing one phase of a bilinear interpolation.

Coupled to output the adders 1030 and 1031 is accumulator 1050, which is further coupled to the filter mode signal and is to either add together or pass the outputs of the adders based on the filter mode signal and whether the first or second lerp phase is being performed. For example, when in the bilinear mode, but performing a first lerp phase, accumulator 1050 is to pass the data received from adders 1030 and 1031 (e.g., as $T_0'$ and $T_1'$). When in the bilinear mode, but performing a second lerp phase, accumulator 1050 performs the shifted addition of the data received from adders 1030 and 1031 to assemble the bilinear interpolated value $T_0''$.

In FIG. 10B, FFB 1001 is in a second state in response to a filter mode signal indicative of a flexible filter mode. In this state, switches 1040 and 1040 are open and coefficients received at inputs 1005 and 1006 are each multiplied by texel values received at inputs 1010A and 1011A, respectively. These scaled values pass through to accumulator 1050. In the flexible filter mode, accumulator 1050 is to sum the received values and output a weighted average of two texels as described elsewhere herein.

Flexible Min/Max Filtering Unit

Further description of a flexible min/max filter logic unit configurable for a determination of minimum and/or maximum texel values over a given footprint is now provided in the context of FIGS. 11-17B. Such a min/max logic unit has hardware flexibility to support the multiple sampler modes described above and output the minimum texel value(s) and/or maximum texel value(s) over any particular filter footprint, as needed. For the sake of clarity, flexible min/max filtering methods and microarchitectures are described in the context of a system where the min/max logic unit is an integrated circuit component of MM FL unit 132 depicted in FIG. 2. Although one or more of the features of the flexible min/max filter logic unit may be advantageously incorporated into MM FL unit 132, it is noted that one or more of the features of the flexible min/max filter logic may be incorporated into a graphics processing system in a number of alternative manners independent of other aspects of MM FL unit 132. As such, one or more features found in the min/max logic unit embodiments describe herein may be implemented without one or more of the features described above in the context of multi-mode filter logic. For example, one or more flexible min/max logic unit embodiments do not require, or rely upon, any further capability of a filter to perform any additional form of filtering (e.g., weighted averaging) over a footprint. Likewise, multi-mode filter logic architecture and methods particular to non-min/max filtering techniques described elsewhere herein (e.g., weighted averaging) do not require any embodiment of a flexible min/max logic unit. Nevertheless, embodiments incorporating a multi-mode sampler supporting a flexible footprint mode along with a flexible min/max logic unit have a synergy that will be clear to one of ordinary skill. Even more synergistic attributes will be evident in exemplary embodiments where flexible min/max logic is incorporated with both a multi-mode sampler supporting a flexible footprint mode, and a multi-mode filter logic unit supporting weighted averaging over a footprint.

Figure 11:
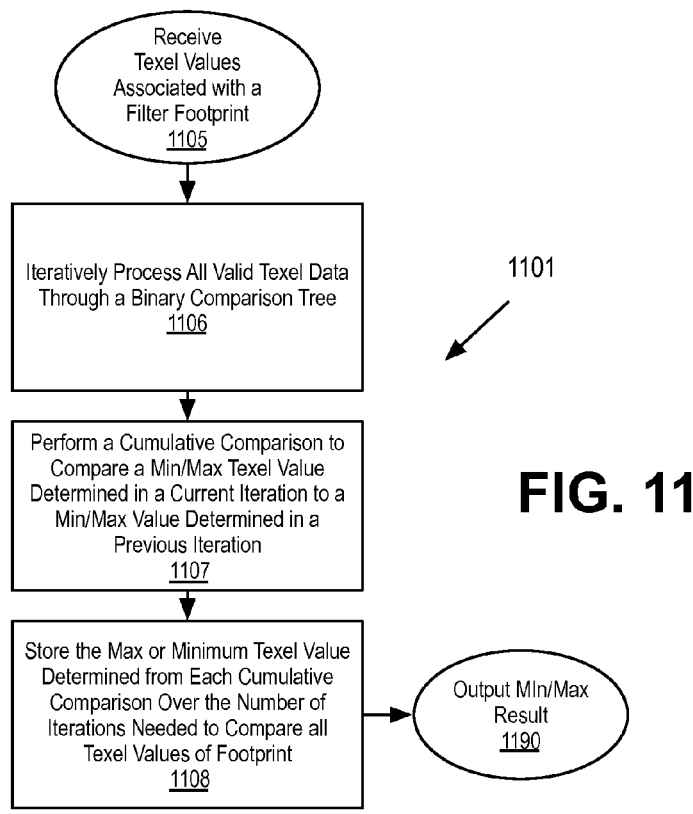
FIG. 11 is a flow diagram of a method for determining a min/max texel value for a plurality of texel values associated with a filter footprint, in accordance with an embodiment.

In embodiments, a graphics processing system includes a "flexible" min/max texture filter suitable for implementing a method for determining a min/max texel value for a plurality of texel values associated with a flexible filter footprint. FIG. 11 is a flow diagram of a method 1101 for determining a min/max texel value for a plurality of texel values associated with a filter footprint, in accordance with one embodiment. Method 1101 begins at operation 1105 with receipt of texel data associated with a particular filter footprint (e.g., any of the footprints depicted in FIG. 5A). In an exemplary embodiment, the texel data entails texel color values that are received in blocks of four nearest neighboring texel 2×2 "quads." Such a 2×2 block of texel values may be advantageously read in as a single cache line.

At operation 1106, the received texel data is processed through a min/max binary comparison tree. While such a tree may be made arbitrarily wide, in the exemplary embodiment provisions are made to allow for a footprint to cover more texels than can be processed in one pass through the tree. This architecture permits the footprint and min/max logic to be scalable. This architecture also makes efficient use of chip area by compacting logic circuitry implementing the comparison tree to a size that can be utilized well for both small and large footprints. Where the tree has fewer inputs than a maximum permissible size of the footprint (e.g., a 64 texel bounding domain depicted in FIG. 5A), texel data associated with the footprint is iteratively processed through the tree at operation 1106. At operation 1107, a cumulative comparison is performed to compare a min/max texel value generated in one iteration with a min/max texel value determined in another iteration. At operation 1108, the maximum or minimum texel value determined by the cumulative comparison over the iterations needed to compare all texel values within a footprint is stored.

As described further below, depending on the utilization of the comparison tree for a given iteration, there may be one or more cumulative comparison performed and therefore, more than one min/max texel value resulting from the iterations performed to cover a particular footprint. Although more than one min/max texel value may be generated, the number of min/max texel values output is fixed. These outputs of the iterative processing may be output as min/max results at operation 1190, for example to an EU (core). Alternatively, a fixed output stage within the min/max logic circuitry may further perform a comparison of all min/max values output for a particular footprint to arrive at a single min/max result that is output (e.g., to an EU) at operation 1190.

Figure 12:
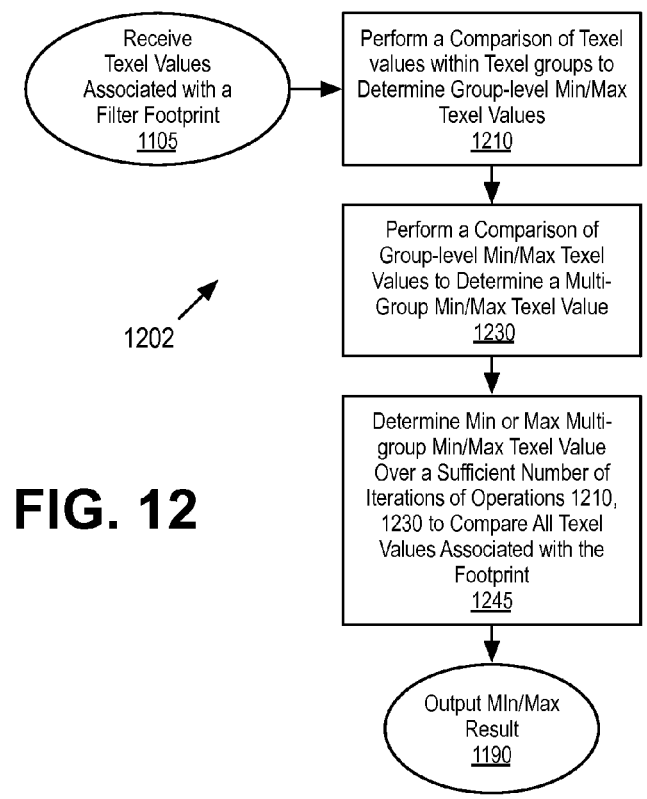
FIG. 12 is a flow diagram further illustrating stages of the method depicted in FIG. 11, in accordance with an embodiment.

In embodiments, the binary comparison tree determines both "group-level" and "multi-group" min/max texel values. FIG. 12 is a flow diagram of a method 1202 that further illustrates stages of the binary comparison performed in method 1101, in accordance with an embodiment. Method 1202 begins again with operation 1105 where texel values are received at inputs of the min/max tree logic circuitry. At operation 1210, a comparison of texel values within a texel group is performed to determine a min/max texel value for a particular group (i.e., a "group-level" min/max value). In the exemplary embodiment, where the texel group is the 2×2 texel quad, three comparisons may be made to determine one group-level min/max value. Each of two texel pairs in the quad are compared, and then the min/max from each pair, or "sub-group" is compared to determine the group-level min/max for the one group. A number (n) of such first comparisons may be performed for as many groups as permitted by the input width of the min/max tree circuitry.

At operation 1230, a comparison of the group-level min/max texel values determined by the first comparison is then performed to determine a "multi-group" min/max texel value. With a binary tree architecture, the number of such comparisons is equal to half the number of groups input into the tree (n/2). Depending on the input width of the tree, one or more binary comparison stages may be employed to arrive at one min/max value for all texel data input into the tree.

At operation 1245, the minimum or maximum multi-group min/max texel value is determined over all the iterations of operations 1210 and 1230 needed to process all texel values associated with a given footprint through the min/max tree. As noted above, iterations may be performed where the input width of the tree logic is smaller than the maximum allowable footprint. Iterations may not be needed as a function of the particular footprint being implemented. Regardless of footprint size and tree logic input width however, embodiments of the binary tree logic include provisions to process as few as one texel group because a footprint may include only one such group, or a final iteration may conclude with one texel group entering the tree. Method 1202 concludes with outputting the min/max result(s) at operation 1290.

Figure 13:
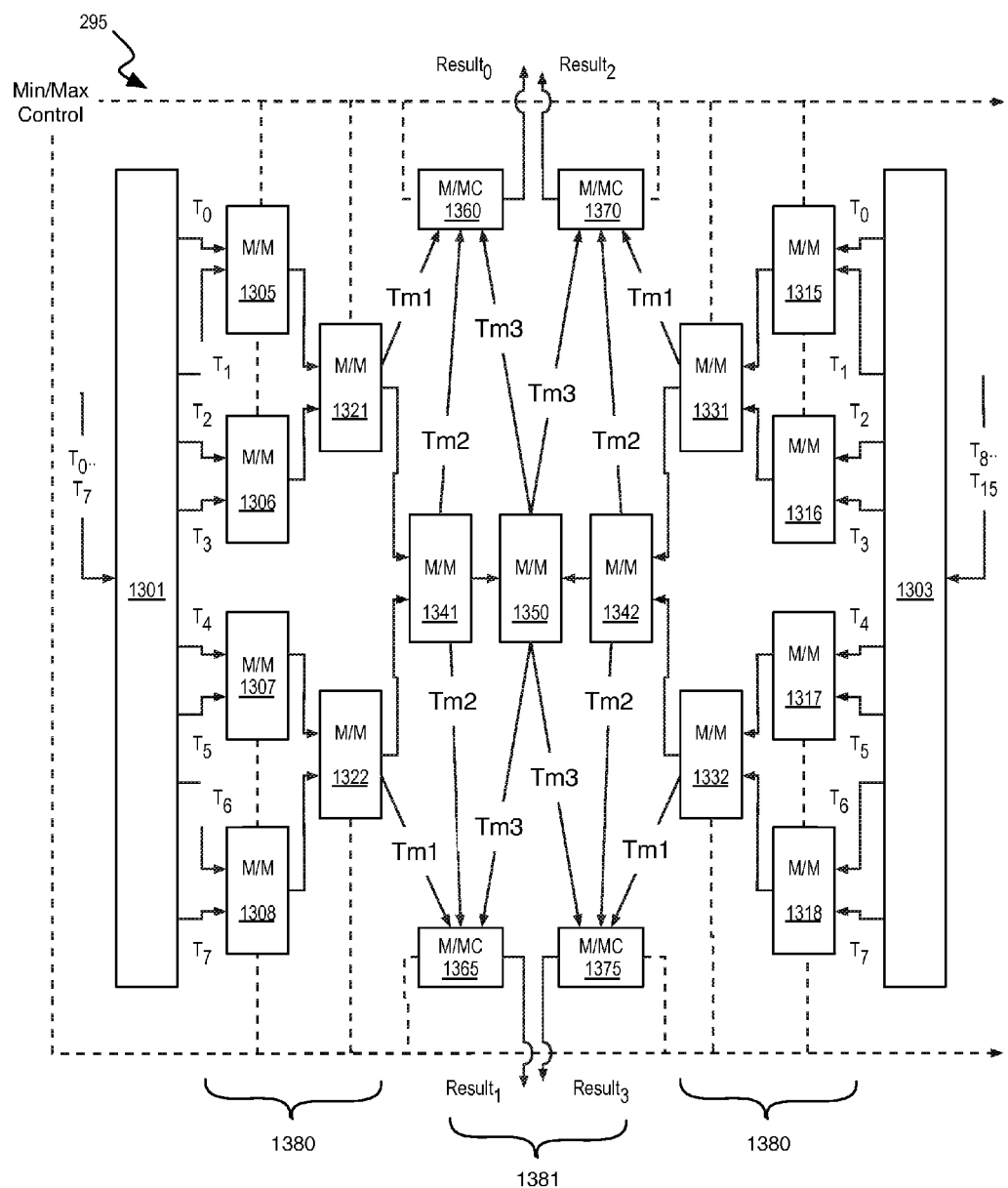
FIG. 13 is a block diagram of a min/max logic circuit tree configured to determine a min/max texel value for a plurality of texel values associated with a filter footprint, in accordance with an embodiment.
Figure 14:
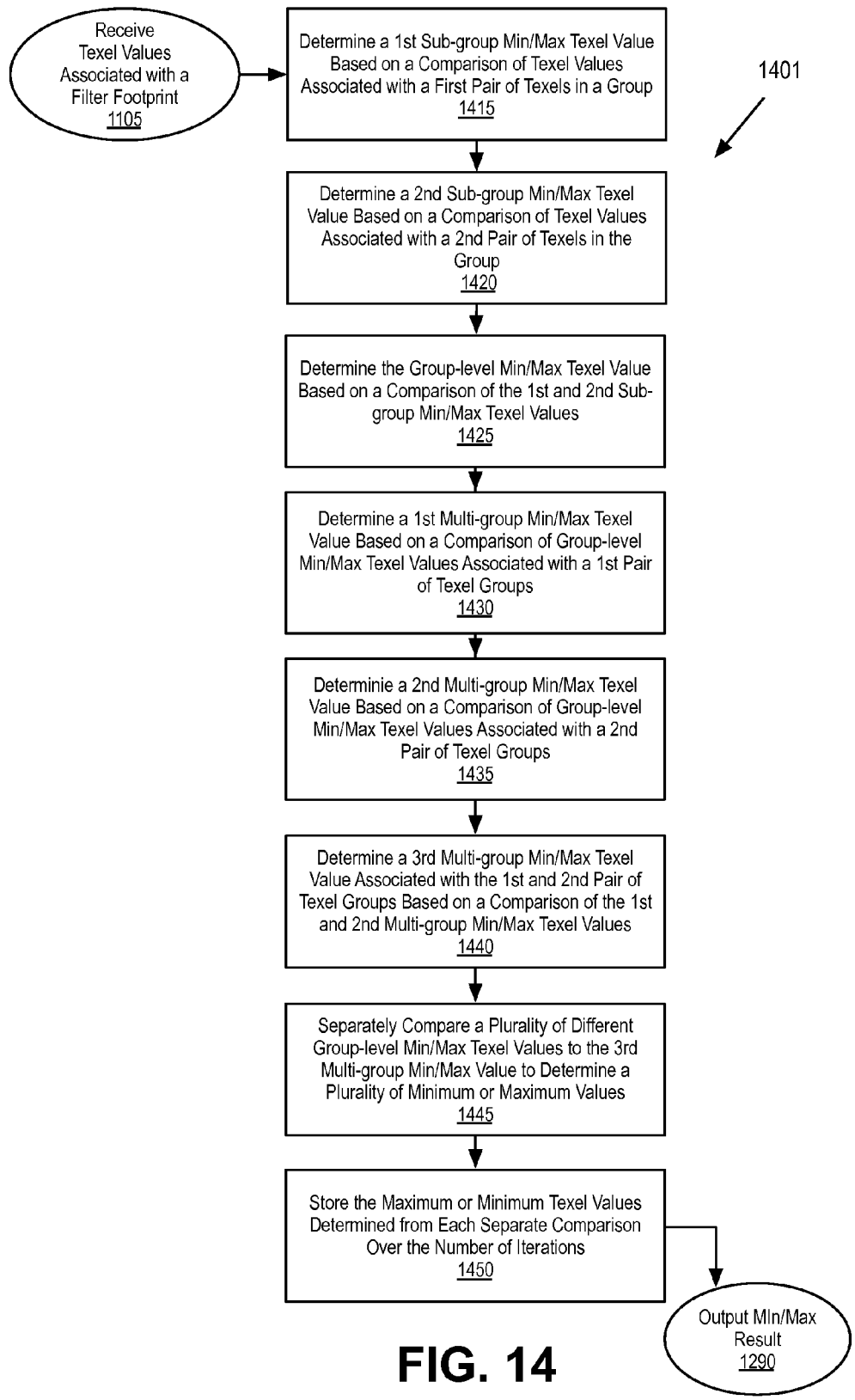
FIG. 14 is a flow diagram of a method for determining a min/max texel value for a plurality of texel values associated with a filter footprint with the min/max logic circuit tree depicted in FIG. 13, in accordance with an embodiment.

FIG. 13 is a block diagram of the exemplary min/max unit 295 incorporated into FL 132. Min/max unit 295 includes logic circuitry configured to determine a min/max texel value for a plurality of texel values associated with a filter footprint, in accordance with an embodiment. FIG. 14 is a flow diagram of a method 1401 for determining a min/max texel value for a plurality of texel values associated with a filter footprint with the min/max logic circuit tree depicted in FIG. 13, in accordance with an embodiment. Particularly salient functions of the components depicted in FIG. 13 are described in the context of method 1401.

Referring to FIG. 13, the min/max unit 295 receives texel data associated with a given footprint through inputs 1301, 1303, which together provide an input data width of sixteen texel values (e.g., $T_0$-$T_{15}$). Eight texel values (e.g., $T_0$-$T_7$) enter through input 1301 and eight texel values (e.g., $T_8$-$T_{15}$) enter through input 1303. For the exemplary embodiment where a group of texels includes four nearest neighboring texels (e.g., 2×2 texel quad 515 depicted in FIG. 5C), the exemplary tree circuit has an input width of four texel groups. Inputs 1301, 1303 may be responsible for formatting texel data and/or distributing the texel data by group to the appropriate tree circuit branch.

Communicatively coupled to inputs 1301, 1303 is first comparison circuitry 1380 responsible for comparisons to determine a group-level min/max texel value for each group input into the tree. Various min/max (M/M) comparison logic blocks within first comparison circuitry 1380 are all coupled to a same min/max control signal line, denoted by dashed line in FIG. 13. A min/max control signal passed on the min/max control signal line specifies whether the comparison circuitry is to determine a minimum or maximum texel value. As further shown, pairs of texel values (e.g., $T_0$-$T_7$) are passed to inputs of min/max comparison blocks 1305, 1306, 1307, and 1308. Similarly, pairs of texel values (e.g., $T_8$-$T_{15}$) are passed to inputs of min/max (M/M) comparison blocks 1315, 1316, 1317, and 1318. These first-stage min/max comparison blocks are to perform the operations 1415 and 1420 of method 1401 (FIG. 14). Each block 1305-1308 is to output one sub-group min/max texel value based on a comparison of texel values associated with a first or second pair of texels in each texel group. As shown in FIG. 13 for example, inputs of min/max comparison block 1305 receive texel values $T_0$, $T_1$ and output the minimum or maximum of $T_0$ and $T_1$ as a first sub-group min/max texel value. Inputs of min/max comparison block 1306 receive texel values $T_2$, $T_3$ and output the minimum or maximum of $T_2$ and $T_3$ as a second sub-group min/max texel value.

Communicatively coupled to the first stage min/max logic bocks are second stage min/max comparison blocks. Each second-stage min/max logic block takes a pair of sub-group min/max texel values as inputs and output one group-level min/max texel value. As shown in FIG. 13, inputs of min/max comparison block 1321 are coupled to outputs of min/max comparison blocks 1305, 1306, and inputs of min/max comparison block 1322 are coupled to outputs of min/max comparison blocks 1307, 1308. Second stage comparison blocks 1331 and 1332 are similarly coupled to first stage comparison blocks 1315, 1316, and 1317, 1318, respectively. Comparison blocks 1321, 1322, 1331 and 1332 are each to perform the operation 1425 (FIG. 14), outputting a group-level min/max texel value based on a comparison of a first and second sub-group min/max texel value. For example, comparison block 1321 outputs $T_0$, $T_1$, $T_2$, or $T_3$ as a min/max texel value ($T_{m1}$) for the one texel group $T_0$-$T_3$.

Second comparison circuitry 1381 is coupled to outputs of first comparison circuitry 1380. Various min/max (M/M) comparison logic blocks within second comparison circuitry 1381 are also all coupled to the min/max control signal line as denoted by dashed line. Second comparison circuitry 1381 includes third stage min/max logic bocks that are communicatively coupled to second stage min/max comparison blocks. Each third stage min/max comparison block is to take a pair of group-level min/max texel values as inputs and output one multi-group min/max texel value. As shown in FIG. 13, inputs of min/max comparison block 1341 are coupled to outputs of min/max comparison blocks 1321, 1322. Third stage comparison block 1342 is similarly coupled to second stage comparison blocks 1331 and 1332. Comparison blocks 1341 and 1342 are to perform the operations 1430 and 1435 (FIG. 14), respectively. Comparison block 1341 outputs a first multi-group min/max texel value based on a comparison of group-level min/max texel values associated with a first pair of texel groups. For example, comparison block 1341 outputs a min/max texel value ($T_{m2}$) for the two texel groups including texel values $T_0$-$T_2$. Comparison block 1342 outputs a second multi-group min/max texel value based on a comparison of group-level min/max texel values associated with a second pair of texel groups. For example, comparison block 1342 outputs a min/max texel value ($T_{m2}$) for the two texel groups including texel values $T_8$-$T_{15}$.

Second comparison circuitry 1381 further includes a fourth stage min/max comparison block coupled to the third stage min/max logic bocks. A fourth stage min/max comparison block takes a pair of multi-group min/max texel values as inputs and outputs one multi-group min/max texel value, thereby further reducing the input texel values to a min/max statistic. As shown in FIG. 13, inputs of min/max comparison block 1350 are coupled to outputs of min/max comparison blocks 1341, 1342. Fourth stage comparison block 1350 is to perform the operation 1440 (FIG. 14), outputting a third multi-group min/max texel value based on a comparison of first and second multi-group min/max texel values. For example, logic block 1350 outputs a min/max texel value ($T_{m3}$) for the four texel groups including texel values $T_0$-$T_{15}$.

As further depicted in FIG. 13, the min/max logic unit 295 further includes cumulative comparison circuitry coupled to at least the second comparison circuitry of the min/max tree. In the exemplary embodiment, the cumulative comparison circuitry includes a plurality of min/max collectors (M/MC), one for each texel group accommodated by the tree inputs. Each min/max collector is communicatively coupled to an output of at least second comparison circuitry 1381. More specifically, each input of min/max collector 1360, 1365, 1370, and 1375 is coupled to the output of min/max comparison block 1350 and is to receive the same min/max texel value (i.e. $T_{m3}$). Each min/max collector is further coupled to the same min/max control signal line denoted by dashed line so as to receive a same min/max control signal.

In the exemplary embodiment, min/max collectors 1360 and 1365 are each further coupled to the output of min/max comparison block 1341 so as to further receive a lower order min/max multi-group texel value (i.e. $T_{m2}$). Likewise, min/max collectors 1370 and 1375 are each further coupled to the output of min/max comparison block 1342. This secondary coupling to second comparison circuitry 1381 is to allow for partial utilization of the min/max tree in any given texel processing iteration for a footprint. In a further embodiment, each min/max collector is communicatively coupled to first comparison circuitry 1380 to receive different group-level min/max texel values (i.e. $T_{m1}$). For example, an input of min/max collector 1360 is further coupled to an output of min/max logic unit 1321 while min/max collector 1365 is further coupled to min/max logic unit 1322. Likewise, an input of min/max collector 1370 is further coupled to an output of min/max logic unit 1331 while min/max collector 1375 is further coupled to min/max logic unit 1332.

With the exemplary architecture, each min/max collector is configured to perform operation 1445 in FIG. 14 where different group-level min/max texel values are separately compared to the same multi-group min/max texel values to arrive at a plurality of minimum or maximum values. Each min/max value determined by a min/max collector is stored at operation 1450 for comparison to other maximum or minimum texel values generated by the various nodes of the tree circuitry over the number of iterations needed to cover the footprint. After all iterations are complete, each min/max collector then provides one min/max texel value output (e.g., Result$_0$, Result$_1$, Result$_2$, and Result$_3$) at operation 1290. With the exemplary architecture therefore, texels associated with a flexible footprint containing a variable number of texel groups are reduced to a min/max statistic having fixed size (e.g., four min/max results). Four min/max results can then be readily processed in an output stage with any conventional technique suitable for any fixed bi-linear texture sample to arrive at a single min/max texel value.

Figure 15:
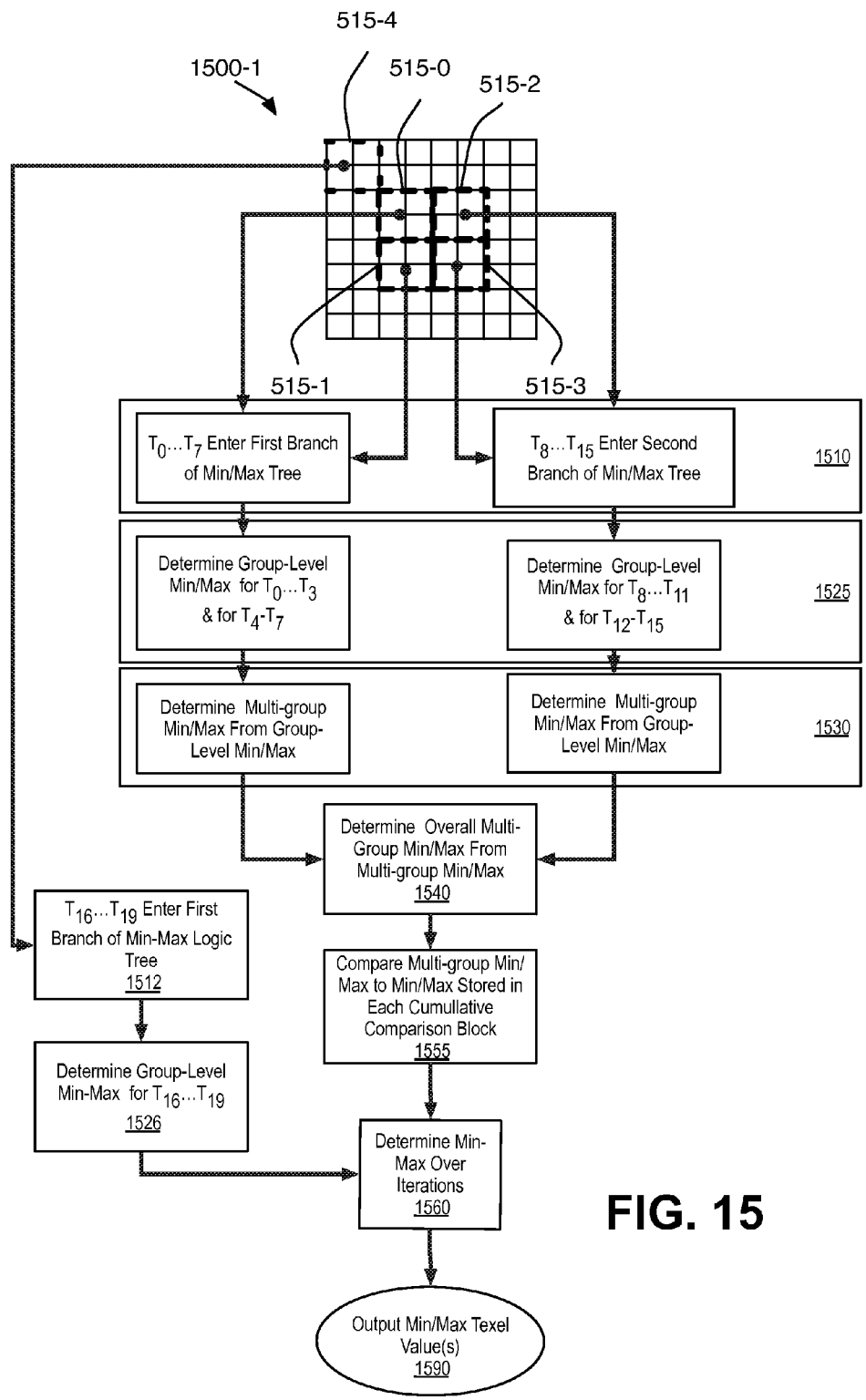
FIG. 15 is a data flow diagram illustrating application of the method depicted in FIG. 14 to an exemplary footprint, in accordance with an embodiment.

FIG. 15 provides a data flow diagram illustrating application of the method 1401 to an exemplary footprint, in accordance with an embodiment. In this example, a footprint 1500-1 includes a total of five texel groups 515-0, 515-1, 515-2, 515-3, and 515-4. Each texel groups is a 2×2 texel quad, with group 515-0 including texel values $T_0$-$T_3$, group 515-1 including texel values $T_4$-$T_7$, group 515-2 including texel values $T_8$-$T_{11}$, group 515-3 including texel values $T_{12}$-$T_{15}$, and group 515-4 including texel values $T_{16}$-$T_{19}$. At operation 1510, texel values $T_0$-$T_7$ enter the first branch of the min/max tree and texel values and texel values $T_8$-$T_{15}$ enter the second branch of the min/max tree. At operation 1525, four group-level min/max values are determined, one for each of group 515-0 through 515-3. At operation 1530 two multi-group min/max values a determined from the four group-level min/max texel values. At operation 1540, an overall multi-group min/max texel value is determined from the two multi-group min/max values. This value is stored in each min/max collector. A second iteration is performed with texel values $T_{16}$-$T_{19}$ from group 515-4 input into a branch of the min/max tree at operation 1512. A group-level min/max for $T_{16}$-$T_{19}$ is determined at operation 1526, which is input into one min/max collector. At operation 1560, the min/max collector compares the group-level texel group 515-4 with the overall multi-group min/max value that was determined in the prior iteration for groups 515-0 through 515-3. The stored values are then updated with minimum or maximum value and output at operation 1590.

Figure 16A:
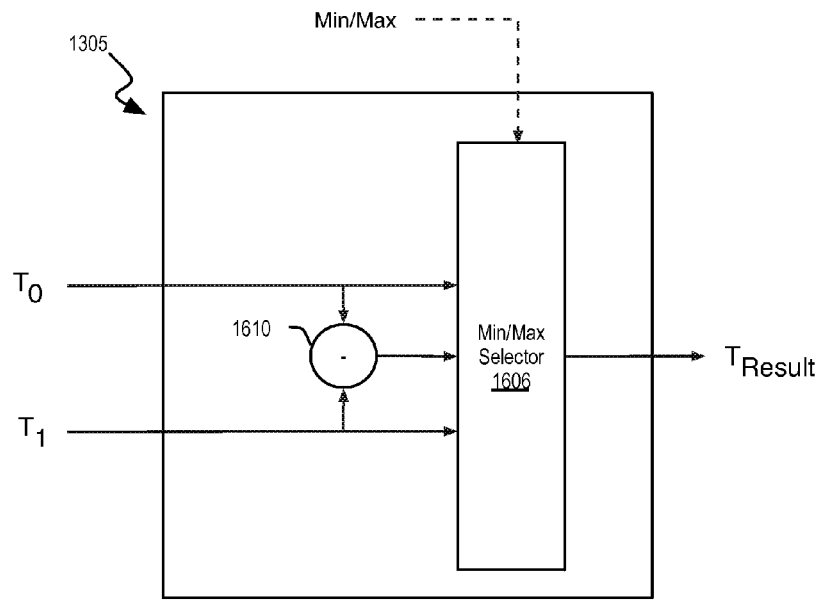
FIG. 16A is a block diagram of a min/max comparison block employed in the min/max logic circuit tree depicted in FIG. 14, in accordance with an embodiment.

In embodiments, each min/max comparison block of a min/max tree includes logic circuitry having a same microarchitecture. FIG. 16A is a block diagram of a min/max comparison block 1305 employed in the min/max logic circuit tree depicted in FIG. 14, in accordance with an embodiment. Min/max comparison block 1305 includes one or more data input signal line to receive texel values (e.g., $T_0$, $T_1$), and one or more control signal line to receive a min/max control signal. Min/max comparison block 1305 further includes logic circuitry to pass to one or more data output signal line the larger of two values received on the one or more data input signal line in response to receiving on the one or more control signal line a first control signal indicative of a maximum filter mode. In response to a second control signal indicative of a minimum filter mode, the logic circuitry of block 1305 is to pass the smaller value of the two values.

In the specific embodiment depicted in FIG. 16A, min/max comparison block 1305 includes subtraction unit 1610 coupled to the data input signal line(s). Subtraction unit 1610 is to output a difference value (e.g., $T_0$-$T_1$). A min/max selector 1606 is coupled to an output of subtraction unit 1610, to the input signal line, and to the control input signal line. The selector is to differentiate between two values (e.g., $T_0$-$T_1$) received on the data input signal lines based on an output of the subtraction unit 1610. The selector is to pass to the data output signal line the larger of two values received on the data input signal line(s) in response to receiving on the control signal line a first control signal indicative of a maximum filter mode, and to pass to the data output the smaller value of the two values in response to a second control signal indicative of a minimum filter mode.

Figure 16B:
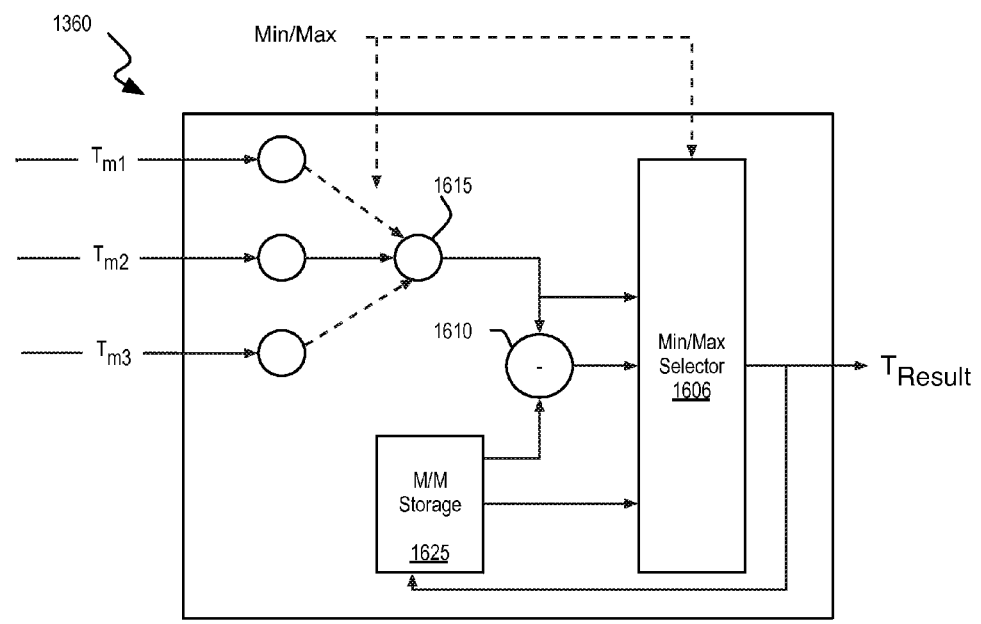
FIG. 16B is a block diagram of a min/max cumulative comparison circuit block employed in the min/max logic circuit tree depicted in FIG. 14, in accordance with an embodiment.

In embodiments, each min/max collector of a min/max tree includes logic circuitry having a same microarchitecture. FIG. 16B is a block diagram of a min/max collector 1360 employed in the cumulative comparison circuitry depicted in FIG. 13, in accordance with an embodiment. Min/max collector 1360 includes a min/max selector, such as min/max selector 1606. Min/max selector 1606 is coupled to an output of subtraction unit 1610 as well as to an input data signal line to receive at least a multi-group min/max texel value (e.g., $T_{m2}$). Subtraction unit 1610 includes inputs coupled to the input data signal line and to an output of buffer 1625 that is to store a predetermined default value or a previously determined min/max value. Buffer 1625 may be any storage of sufficient width to store the min/max texel value, such as a 32 bit register for storing a 32 bit min/max texel value. Min/max selector 1606 is to pass to one or more data output signal line the larger of two values received from the input data signal line and the value in buffer 1625 in response to receiving a first min/max control signal indicative of a maximum filter mode. Min/max selector 1606 is further to pass the smaller of two values received from the input data signal line and the value in buffer 1625 in response to receiving a second min/max control signal indicative of a minimum filter mode. Buffer 1625 has an input coupled to the data output signal and is updated with the data signal (e.g., $T_{Result}$) output by min/max selector 1606.

For the exemplary embodiment depicted in FIG. 16B, min/max collector 1360 accommodates multiple input min/max values, for example from the three min/max comparison blocks 1321, 1341 and 1350 depicted in FIG. 13. In FIG. 16B, selector 1615 is to switch between a first input signal line configured to provide a group-level min/max texel value (e.g., $T_{m1}$) and a second input signal line configured to provide a multi-group min/max texel value (e.g., $T_{m2}$). Selector 1615 may be further configured to switch to a third input signal line configured to provide additional multi-group min/max texel values (e.g., $T_{m3}$). Selector 1615 may in some embodiments have states set based on the min/max control signal. Alternatively, values from all three texel value inputs may be passed to min/max selector having a wider input width. Logic circuitry of min/max selector 1606 coupled to an output of selector 1615 and an output of buffer 1625 is to select between the min/max texel value generated by one iteration through the min/max tree circuitry and a default value or a min/max texel value stored from another (prior) iteration.

In the exemplary microarchitecture embodiments illustrated in FIGS. 16A and 16B, where there is no contributing texel value (e.g., where less than a full width of the min/max tree is needed) a predetermined default value may be passed through the various stages in the min/max tree, as well as through the min/max collectors (e.g., stored in buffer 1625). The default value may be any value that ensures a contributing texel will always defeat the default value in a comparison. Microarchitectures utilizing a default value are however only one embodiment, and many alternative microarchitectures achieving the same function are possible. As one example, a status flag may be passed through min/max tree circuitry and each comparison result then determined based on the status flag as well as the input texel values.

Figure 17A:
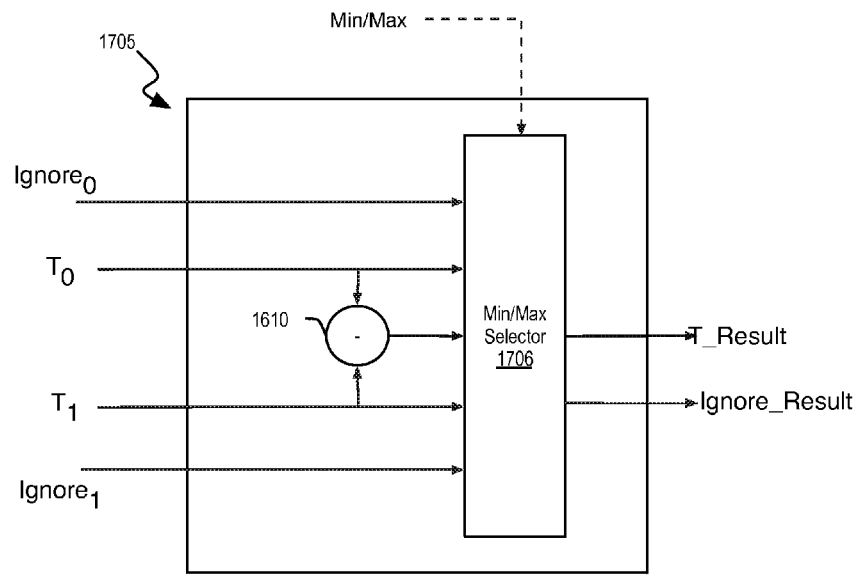
FIG. 17A is a block diagram of a min/max comparison block, in accordance with an alternate embodiment.
Figure 17B:
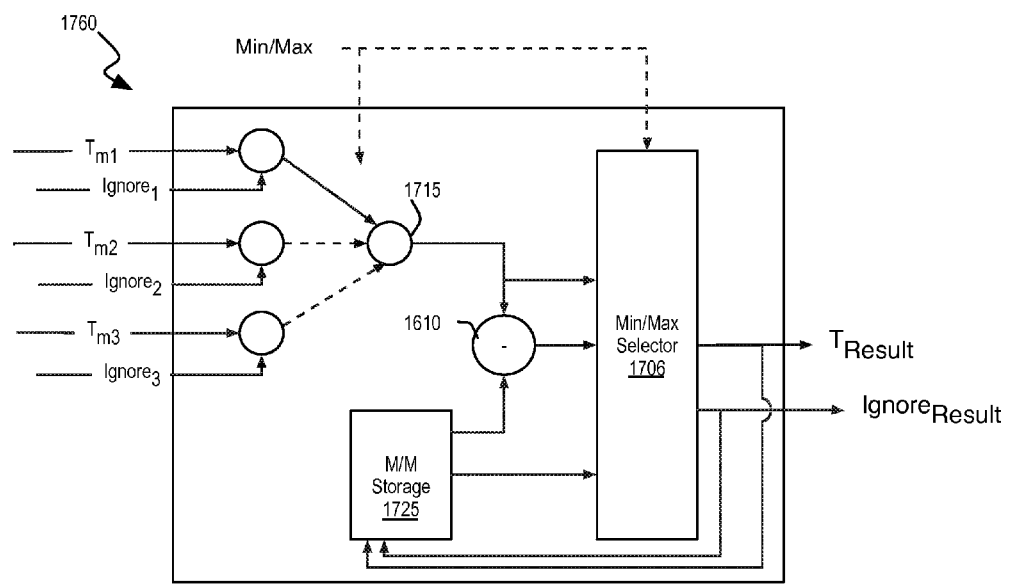
FIG. 17B is a block diagram of a min/max cumulative comparison circuit block, in accordance with an alternate embodiment.

FIGS. 17A, 17B depict embodiments where a one-bit "ignore" flag is received as an input to a logic block. FIG. 17A is a block diagram of a min/max comparison block 1705 that achieves the same functionality as min/max comparison block 1605, and as such, may also implement the min/max comparison blocks in a min/max circuit tree embodiment described elsewhere herein. As shown in FIG. 17A, min/max comparison block 1705 includes subtraction unit 1610 coupled to the data input signal line(s) and is to output a difference value (e.g., $T_0$-$T_1$). A min/max selector 1606 is coupled to an output of subtraction unit 1610, to the input signal line(s), to the control input signal line, and further to ignore signal lines (e.g., $Ignore_0$, $Ignore_1$). Depending on values of the ignore signal (e.g., logic hi/logic lo), min/max selector 1606 is to pass one or other of input texel values $T_0$, $T_1$. For example, where $Ignore_0$ is logic high, $T_1$ is passed regardless of the value of $T_0$, $T_1$, or the $T_0$-$T_1$ difference output by subtraction unit 1610. The selector is then to differentiate between two values $T_0$,$T_1$ based on the ignore signals as well as on an output of the subtraction unit 1610. Along with the output signal (e.g., $T_{Result}$), logic circuitry of min/max selector 1606 outputs an ignore status signal (e.g., $Ignore_{Result}$) that may be propagated to down stream comparison stages.

FIG. 17B is a block diagram of a min/max collector 1760 that achieves the same functionality as min/max collector 1360, and as such, may also implement the cumulative comparison circuitry described elsewhere herein. In FIG. 17B, selector 1715 is to select between a first input signal line configured to provide a group-level min/max texel value (e.g., $T_{m1}$), second input signal line configured to provide a multi-group min/max texel value (e.g., $T_{m2}$), and third input signal line configured to provide another multi-group min/max texel value (e.g., $T_{m3}$). For each texel input channel, a corresponding ignore signal is also coupled by selector 1615 to circuitry of min/max selector 1706. Logic circuitry of min/max selector 1606 is to select between the min/max texel value generated by a particular iteration through the min/max tree circuitry and a default value or a min/max texel value stored in buffer 1705 from another (prior) iteration. The min/max texel value passed by min/max selector 1706 is further dependent on one or more ignore status signal passed into cumulative comparison block 1760, substantially as described above of min/max comparison logic block 1705. Along with the output signal (e.g., $T_{Result}$), an associated ignore signal (e.g., $Ignore_{Result}$) is input into buffer 1725 for use in a subsequent min/max iteration. Buffer 1725 therefore may include a 32-bit register for storing a min/max value and a 1-bit register for storing the associated ignore status flag bit.

Figure 18:
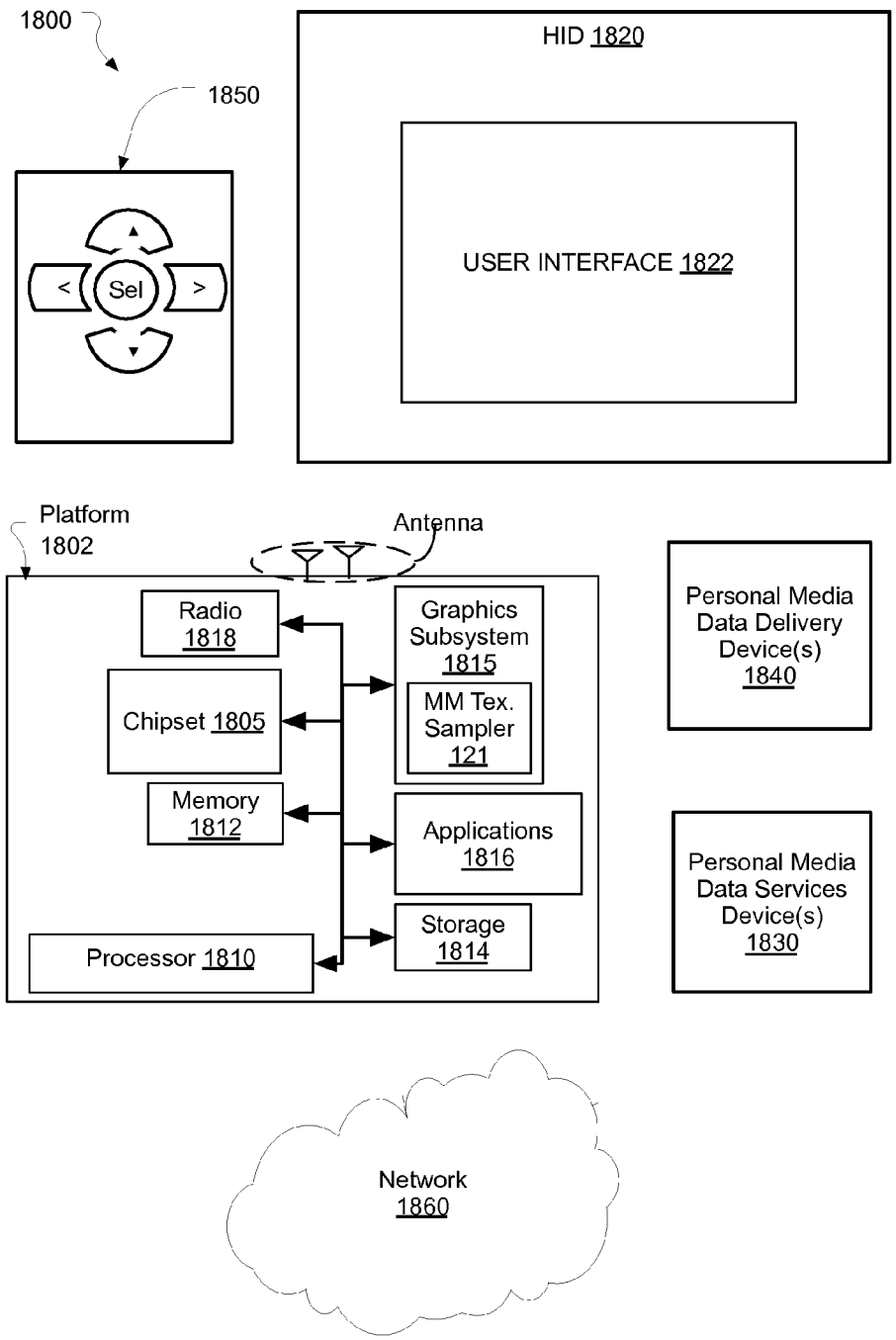
FIG. 18 is an illustrative diagram of an exemplary system, in accordance with embodiments.

FIG. 18 is an illustrative diagram of an exemplary system 1800, in accordance with embodiments. System 1800 may implement all or a subset of the various functional blocks depicted in FIG. 2. For example, in one embodiment the MM texture sampler 121 is included in the system 1800. System 1800 may be a mobile device although system 1800 is not limited to this context. For example, system 1800 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 1800 may also be an infrastructure device. For example, system 1800 may be incorporated into a large format television, set-top box, desktop computer, or other home or commercial network device.

In various implementations, system 1800 includes a platform 1802 coupled to a HID 1820. Platform 1802 may receive captured personal media data from a personal media data services device(s) 1830, a personal media data delivery device(s) 1840, or other similar content source. A navigation controller 1850 including one or more navigation features may be used to interact with, for example, platform 1802 and/or HID 1820. Each of these components is described in greater detail below.

In various implementations, platform 1802 may include any combination of a chipset 1805, processor 1810, memory 1812, storage 1814, graphics subsystem 1815, applications 1816 and/or radio 1818. Chipset 1805 may provide intercommunication among processor 1810, memory 1812, storage 1814, graphics subsystem 1815, applications 1816 and/or radio 1818. For example, chipset 1805 may include a storage adapter (not depicted) capable of providing intercommunication with storage 1814.

Processor 1810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1810 may be a multi-core processor(s), multi-core mobile processor(s), and so forth. In one exemplary embodiment, processor 1810 invokes or otherwise implements processes and/or methods of the CMMS 1801 and the various modules described in as components of CMMS 1801 elsewhere herein.

Memory 1812 may be implemented as a volatile memory device such as, but not limited to, a Random Access Memory (RAM), Dynamic Random Access Memory (DRAM), or Static RAM (SRAM).

Storage 1814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1814 may include technology to increase the storage performance enhanced protection for valuable digital media when multiple hard drives are included, for example.

Graphics subsystem 1815 may perform processing of images such as still or video media data for display. Graphics subsystem 1815 may be a graphics processing unit (GPU) or a visual processing unit (VPU), for example. An analog or digital interface may be used to communicatively couple graphics subsystem 1815 and display 1820. For example, the interface may be any of a High-Definition Multimedia Interface, Display Port, wireless HDMI, and/or wireless HD compliant techniques. Graphics subsystem 1815 may be integrated into processor 1810 or chipset 1805. In some implementations, graphics subsystem 1815 may be a stand-alone card communicatively coupled to chipset 1805.

The texture sampler features and related texture sampling and filtering techniques described herein may be implemented in various hardware architectures. For example, graphics and/or video functionality may be integrated within a chipset. Alternatively, a discrete graphics and/or video processor may be used. As still another embodiment, the methods and functions described herein may be provided by a general purpose processor, including a multi-core processor. In further embodiments, the methods and functions may be implemented in a purpose-built consumer electronics device.

Radio 1818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, HID 1820 may include any television type monitor or display. HID 1820 may include, for example, a computer display screen, touch screen display, video monitor, television-like device, and/or a television. HID 1820 may be digital and/or analog. In various implementations, HID 720 may be a holographic display. Also, HID 1820 may be a transparent surface that may receive a visual projection. Such projections may convey various forms of information, images, and/or objects. For example, such projections may be a visual overlay for a mobile augmented reality (MAR) application. Under the control of one or more software applications 1816, platform 1802 may display user interface 1822 on HID 1820.

In various implementations, personal media services device(s) 1830 may be hosted by any national, international and/or independent service and thus accessible to platform 1802 via the Internet, for example. Personal media services device(s) 1830 may be coupled to platform 1802 and/or to display 1820. Platform 1802 and/or personal services device(s) 1830 may be coupled to a network 1860 to communicate (e.g., send and/or receive) media information to and from network 1860. Personal media delivery device(s) 1840 also may be coupled to platform 1802 and/or to HID 1820.

In various implementations, personal media data services device(s) 730 may include a cable television box, personal computer, network, telephone, Internet enabled devices or appliance capable of delivering digital information and/or content, and any other similar device capable of unidirectionally or bidirectionally communicating content between a media data provider and platform 1802, via network 1860 or directly. It will be appreciated that the content may be communicated unidirectionally and/or bidirectionally to and from any one of the components in system 1800 and a provider via network 1860. Examples of personal media include any captured media information including, for example, video, music, medical and gaming information, and so forth.

Personal media data services device(s) 1830 may receive content including media information with examples of content providers including any cable or satellite television or radio or Internet content providers. The provided examples are not meant to limit implementations in accordance with the present disclosure in any way.

In various implementations, platform 1802 may receive control signals from navigation controller 1850 having one or more navigation features. The navigation features of controller 1850 may be used to interact with user interface 1822, for example. In embodiments, navigation controller 1850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1850 may be replicated on a display (e.g., HID 720) by movements of a pointer, cursor, focus ring, or other visual indicators displayed on the display. For example, under the control of software applications 1816, the navigation features located on navigation controller 1850 may be mapped to virtual navigation features displayed on user interface 1822, for example. In embodiments, controller 1850 may not be a separate component but may be integrated into platform 1802 and/or HID 1820. The present disclosure, however, is not limited to the elements or in the context shown or described herein.

In various implementations, drivers (not shown) may include technology to enable users to instantly turn on and off platform 1802 like a television with the touch of a button after initial boot-up, when enabled, for example. Program logic may allow platform 1802 to stream content to media adaptors or other personal media services device(s) 1830 or personal media delivery device(s) 1840 even when the platform is turned "off" In addition, chipset 1805 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1800 may be integrated. For example, platform 1802 and personal media data services device(s) 1830 may be integrated, or platform 1802 and captured media data delivery device(s) 1840 may be integrated, or platform 1802, personal media services device(s) 1830, and personal media delivery device(s) 1840 may be integrated, for example. In various embodiments, platform 1802 and HID 1820 may be an integrated unit. HID 1820 and content service device(s) 1830 may be integrated, or HID 1820 and personal media delivery device(s) 1840 may be integrated, for example. These examples are not meant to limit the present disclosure.

In various embodiments, system 1800 may be implemented as a wireless system, a wired system, or a combination of both. When implemented as a wireless system, system 1800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1800 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 18.

Figure 19:
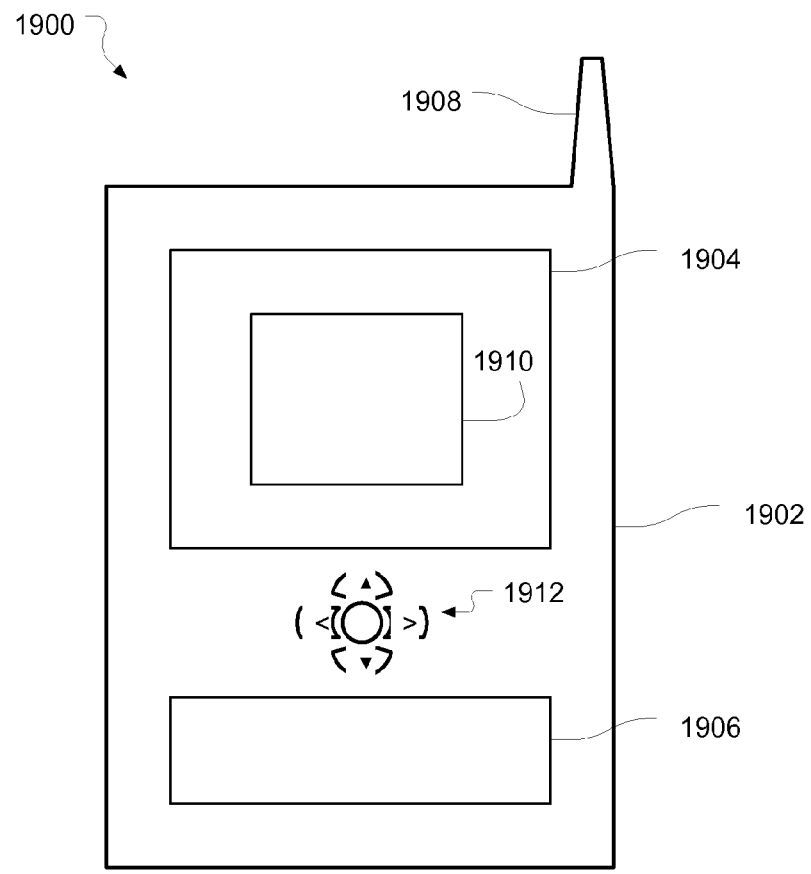
FIG. 19 is an illustrative diagram of an exemplary system, arranged in accordance with an embodiment.

As described above, system 1800 may be embodied in varying physical styles or form factors. FIG. 19 illustrates embodiments of a small form factor device 1900 in which system 1200 may be embodied. In embodiments, for example, device 1900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 19, device 1900 may include a housing 1902, a display 1904, an input/output (I/O) device 1906, and an antenna 1908. Device 1900 also may include navigation features 1912. Display 1904 may include any suitable display unit for displaying information appropriate for a mobile computing device. I/O device 1906 may include any suitable I/O device for entering information into a mobile computing device. Examples for I/O device 1906 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: programs, applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Instructions representing various logic within the processor, which when read by a machine may also cause the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

In one or more first embodiments, a graphics processing system with a min/max texture filter includes input circuitry to receive texel data for a plurality of texel groups associated with a filter footprint, wherein each texel group includes four nearest neighboring texels. The min/max texture filter includes comparison circuitry coupled to the input circuitry to compare pairs of texel values to determine a minimum or maximum value for a set of texel inputs associated with one comparison iteration. The min/max texture filter includes cumulative comparison circuitry coupled to the comparison circuitry to accumulate the maximum or minimum texel value over a number of comparison iterations to compare all texel values in the plurality of texel groups associated with the footprint.

In furtherance of the one or more first embodiments, the comparison circuitry further includes a first comparison of min/max texel values within texel groups to determine group-level min/max texel values. The comparison circuitry further includes second comparison circuitry coupled to the first comparison circuitry to perform a second comparison of group-level min/max texel values to determine a multi-group min/max texel value. The cumulative comparison circuitry is coupled to at least the second comparison circuitry to accumulate the maximum or minimum multi-group min/max texel value over a number of iterations of the first and second comparisons sufficient to compare all texel values in the plurality of texel groups associated with the footprint In furtherance of the one or more first embodiments, the comparison circuitry further includes a first comparison of min/max texel values within texel groups to determine group-level min/max texel values. Second comparison circuitry is coupled to first comparison circuitry to perform a second comparison of group-level min/max texel values to determine a multi-group min/max texel value. The cumulative comparison circuitry is coupled to at least the second comparison circuitry to accumulate the maximum or minimum multi-group min/max texel value over a number of iterations of the first and second comparisons sufficient to compare all texel values in the plurality of texel groups associated with the footprint.

In furtherance of the one or more first embodiments, the cumulative comparison circuitry further comprises a plurality of min/max collector coupled to receive a same min/max control signal. Each min/max collector is communicatively coupled to first comparison circuitry to receive different group-level min/max texel values. Each min/max collector is communicatively coupled to second comparison circuitry to receive the same multi-group min/max values. Each min/max collector is to compare the different group-level min/max texel values to the same multi-group min/max texel values and store the maximum or minimum texel value determined over the number of iterations.

In furtherance of the one or more first embodiments, the input circuitry comprises one or more input to receive texel data for n texel groups. The input circuitry includes first comparison circuitry including 2n first stage min/max comparison blocks coupled to the input circuitry, wherein each first stage comparison block is to receive two texel values and output one sub-group min/max texel value. The input circuitry includes n second stage min/max comparison block coupled to the first stage min/max comparison blocks, wherein each second stage comparison block is to receive two sub-group min/max texel values and output one group-level min/max texel value. Second comparison circuitry includes n/2 third stage min/max comparison blocks coupled to the second stage min/max comparison blocks, wherein each third stage comparison block is to receive two group-level min/max texel values and output one multi-group min/max texel value. The cumulative comparison circuitry includes n min/max collectors, wherein each min/max collector is communicatively coupled to one of the second stage min/max comparison blocks and one of the third stage min/max comparison blocks.

In furtherance of the one or more first embodiments, the input circuitry includes one or more input to receive texel data for four texel groups. The input circuitry is coupled to first comparison circuitry having eight first stage min/max comparison blocks coupled to the input circuitry, wherein each first stage comparison block is to receive two texel values and output one sub-group min/max texel value. The first comparison circuitry further includes four second stage min/max comparison blocks coupled to the first stage min/max comparison blocks. Each second stage comparison block is to receive two sub-group min/max texel values and output one group-level min/max texel value. The first comparison circuitry is coupled to second comparison circuitry including two third stage min/max comparison blocks coupled to the second stage min/max comparison blocks, wherein each third stage comparison block is to receive two group-level min/max texel values and output one multi-group min/max texel value. The cumulative comparison circuitry includes four min/max collectors. Each second stage min/max comparison blocks is communicatively coupled to one of the min/max collectors. Each of the third stage min/max comparison blocks is communicatively coupled to two of the min/max collectors.

In furtherance of the one or more first embodiments, the input circuitry comprises one or more input to receive texel data for four texel groups. The input circuitry is coupled to first comparison circuitry having eight first stage min/max comparison blocks coupled to the input circuitry, wherein each first stage comparison block is to receive two texel values and output one sub-group min/max texel value. The first comparison circuitry further includes four second stage min/max comparison blocks coupled to the first stage min/max comparison blocks, wherein each second stage comparison block is to receive two sub-group min/max texel values and output one group-level min/max texel value. The first comparison circuitry is coupled to second comparison circuitry having two third stage min/max comparison blocks coupled to the second stage min/max comparison blocks, wherein each third stage comparison block is to receive two group-level min/max texel values and output one multi-group min/max texel value. A fourth stage min/max comparison block is coupled to the third stage min/max comparison blocks, wherein the fourth stage comparison block is to receive two multi-group min/max texel values and output one multi-group min/max texel value. The cumulative comparison circuitry includes four min/max collectors. Each min/max collector is communicatively coupled to one of the second stage min/max comparison blocks, one of the third stage min/max comparison blocks, and the fourth stage min/max comparison block.

In furtherance of the one or more first embodiments, the input circuitry includes one or more input to receive texel data for four texel groups. The input circuitry is coupled to first comparison circuitry having eight first stage min/max comparison blocks coupled to the input circuitry, wherein each first stage comparison block is to receive two texel values and output one sub-group min/max texel value. The first comparison circuitry further includes four second stage min/max comparison block coupled to the first stage min/max comparison blocks, wherein each second stage comparison block is to receive two sub-group min/max texel values and output one group-level min/max texel value. The first comparison circuitry is coupled to second comparison circuitry having two third stage min/max comparison block coupled to the second stage min/max comparison blocks, wherein each third stage comparison block is to receive two group-level min/max texel values and output one multi-group min/max texel value. The second comparison circuitry further includes a fourth stage min/max comparison block coupled to the third stage min/max comparison blocks, wherein the fourth stage comparison block is to receive two multi-group min/max texel values and output one multi-group min/max texel value. The cumulative comparison circuitry comprises four min/max collectors. Each of the second stage min/max comparison blocks is communicatively coupled to one of the min/max collectors. Each of the third stage min/max comparison blocks is communicatively coupled to two of the min/max collectors. The fourth stage min/max comparison block is communicatively coupled to four of the min/max collectors.

In furtherance of the one or more first embodiments, the comparison circuitry comprises a plurality of min/max comparison blocks, each min/max comparison block further includes one or more data input signal line, one or more control signal line, and logic circuitry to pass to one or more data output signal line the larger of two values received on the one or more data input signal line in response to receiving on the one or more control signal line a first control signal indicative of a maximum filter mode, and to pass to the data output the smaller value of the two values in response to a second control signal indicative of a minimum filter mode.

In furtherance of the one or more first embodiments, the comparison circuitry comprises a plurality of min/max comparison blocks. Each min/max comparison block further includes a data input signal line, a control signal line, a data output signal line, a subtraction unit coupled to the pair of data input signal line, and a selector coupled to an output of the subtraction unit, to the input signal line, and to the control input signal line. The selector is to differentiate between two values received on the data input signal line based on an output of the subtraction unit, and pass to the data output signal line the larger of two values received on the data input signal line in response to receiving on the control signal line a first control signal indicative of a maximum filter mode, and to pass to the data output the smaller value of the two values in response to a second control signal indicative of a minimum filter mode.

In furtherance of the one or more first embodiments, the cumulative comparison circuitry further comprises an input data signal line to receive the multi-group min/max texel value. The cumulative comparison circuitry further comprises a buffer to store a predetermined default value or a previously determined min/max value. The cumulative comparison circuitry further comprises circuitry coupled to the input data signal line and an output of the buffer, the circuitry to pass to one or more data output signal line the larger of two values received from the input data signal line and the buffer output in response to receiving a first control signal indicative of a maximum filter mode, and to pass the smaller of two values received from the input data signal line and the buffer output in response to receiving a second control signal indicative of a minimum filter mode. The cumulative comparison circuitry further comprises an update signal line coupling the data output signal to an input of the buffer.

In furtherance of the one or more first embodiments, the cumulative comparison circuitry further includes a selector to select between a first input signal line configured to provide a group-level min/max texel value and a second input signal line configured to provide a multi-group min/max texel value. The cumulative comparison circuitry further includes a buffer to store a predetermined default value or a previously determined min/max values. The cumulative comparison circuitry further includes logic circuitry coupled to an output of the selector and an output of the buffer, the logic circuitry to pass to one or more data output signal line the larger of two values received from the selector and the buffer in response to receiving a first control signal indicative of a maximum filter mode, and to pass the smaller of two values received from the selector and the buffer in response to receiving a second control signal indicative of a minimum filter mode. The cumulative comparison circuitry further includes an update signal line coupling the data output signal to an input of the buffer.

In one or more second embodiments, a method for determining a min/max texel value for a plurality of texel values associated with a filter footprint includes receiving texel data for texel groups associated with the footprint, wherein each texel group includes four nearest neighboring texels. The method includes iteratively processing the texel data through a binary comparison logic tree. The method includes performing a cumulative comparison to compare a min/max texel value determined in one iteration with a min/max value determined in another iteration over the number of iterations needed to compare all texel values in the plurality of texel groups associated with the footprint. The method includes storing the maximum or minimum texel value determined from each cumulative comparison.

In furtherance of the one or more second embodiments, processing the texel data through the binary comparison logic tree further includes performing a first comparison of texel values within texel groups to determine group-level min/max texel values, and performing a second comparison of group-level min/max texel values to determine a multi-group min/max texel value. The cumulative comparison determines a minimum or maximum multi-group min/max texel value for the number of iterations.

In furtherance of the one or more second embodiments, the method further includes sending a min/max control signal to a plurality of min/max comparison blocks and a plurality of min/max collectors. Processing the texel data through the binary comparison logic tree is based on the min/max control signal, the logic tree including a plurality of stages, each stage including a min/max comparison block controlled by the min/max control signal. The cumulative comparison further includes separately comparing a plurality of different group-level min/max texel values generated by one iteration to a same multi-group min/max value generated in another iteration and storing the maximum or minimum texel value determined from each separate comparison over the iterations performed for the footprint.

In furtherance of the one or more second embodiments, a first comparison is performed. The first comparison includes determining a first sub-group min/max texel value based on a comparison of texel values associated with a first pair of texels in a texel group. Performing the first comparison further includes determining a second sub-group min/max texel value based on a comparison of texel values associated with a second pair of texels in the texel group. Performing the first comparison further includes determining the group-level min/max texel value based on a comparison of the first and second sub-group min/max texel values. Performing the second comparison includes determining a first multi-group min/max texel value based on a comparison of group-level min/max texel values associated with a first pair of texel groups. Performing the second comparison includes determining a second multi-group min/max texel value based on a comparison of group-level min/max texel values associated with a second pair of texel groups. Performing the second comparison includes determining a third multi-group min/max texel value associated with the first and second pair of texel groups based on a comparison of the first and second multi-group min/max texel values.

In furtherance of the one or more second embodiments, receiving the texel data comprises receiving texel data for more than four texel groups. First and second comparisons are performed for a first iteration to determine a first multi-group min/max texel value. At least the first comparison is performed to determine one or more second group-level min/max texel value. The cumulative comparison includes determining the maximum or minimum of the first multi-group min/max texel value, and the one or more second group-level min/max texel value.

In furtherance of the one or more second embodiments, a first comparison is performed. The first comparison includes determining eight sub-group min/max texel values based on eight comparisons of texel values associated with pairs of texels in each of the texel groups. The first comparison includes determining four group-level min/max texel value based on four comparisons of pairs of sub-group min/max texel values. A second comparison is performed. The second comparison includes determining a first and second multi-group min/max texel value based on two comparisons of group-level min/max texel values associated with pairs of texel groups. The second comparison includes determining a third multi-group min/max texel value associated with the first and second pair of texel groups based on a comparison of the first and second multi-group min/max texel values. The cumulative comparison includes separately comparing a plurality of different group-level min/max texel values to the third multi-group min/max value to determine a plurality of maximum or minimum values.

In furtherance of the one or more second embodiments, the cumulative comparison further includes receiving the multi-group min/max texel value. The cumulative comparison further includes storing a predetermined default value or a previously determined min/max value. The cumulative comparison further includes passing to one or more data output signal line the larger of the received texel value or stored value in response to receiving a first control signal indicative of a maximum filter mode, and passing the smaller of the received texel value or stored value in response to receiving a second control signal indicative of a minimum filter mode. The cumulative comparison further includes updating the stored value with the value passed to the one or more data output signal line.

In one or more third embodiments, a computer-readable media stores instructions thereon, which when executed by a processor, cause the processor to perform a method for determining a min/max texel value for a plurality of texel values associated with a filter footprint. The method includes receiving texel data for texel groups associated with the footprint, wherein each texel group includes four nearest neighboring texels. The method includes iteratively processing the texel data through a binary comparison logic tree. The method includes performing a cumulative comparison to compare a min/max texel value determined in one iteration with a min/max value determined in another iteration over the number of iterations needed to compare all texel values in the plurality of texel groups associated with the footprint. The method includes storing the maximum or minimum texel value determined from each cumulative comparison.

In furtherance of the one or more second embodiments, the media further includes instructions for performing a first comparison by determining a first sub-group min/max texel value based on a comparison of texel values associated with a first pair of texels in a texel group. The media further includes instructions for performing a first comparison further by determining a second sub-group min/max texel value based on a comparison of texel values associated with a second pair of texels in the texel group. The media further includes instructions for performing a first comparison further by determining the group-level min/max texel value based on a comparison of the first and second sub-group min/max texel values. The media further includes instructions for performing a second comparison by determining a first multi-group min/max texel value based on a comparison of group-level min/max texel values associated with a first pair of texel groups. The media further includes instructions for performing the second comparison further by determining a second multi-group min/max texel value based on a comparison of group-level min/max texel values associated with a second pair of texel groups. The media further includes instructions for performing a second comparison further by determining a third multi-group min/max texel value associated with the first and second pair of texel groups based on a comparison of the first and second multi-group min/max texel values.

It will be recognized that the implementation is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the implementation should, therefore, be determined with reference to the appended claims, along with the full scope of equivalents to which such claims are entitled.

What is claimed is:

1. A graphics processing system with a min/max texture filter, the filter comprising:
   input circuitry to receive texel data for a plurality of texel groups associated with a filter footprint, wherein each texel group includes four nearest neighboring texels;
   comparison circuitry coupled to the input circuitry to compare pairs of texel values to determine a minimum or maximum value for a set of texel inputs associated with one comparison iteration, wherein the comparison circuitry further comprises:
      first comparison circuitry to perform a first comparison of min/max texel values within texel groups to determine group-level min/max texel values;
      second comparison circuitry coupled to the first comparison circuitry to perform a second comparison of group-level min/max texel values to determine a multi-group min/max texel value; and
   cumulative comparison circuitry coupled to the comparison circuitry to accumulate the maximum or minimum texel value over a number of comparison iterations to compare all texel values in the plurality of texel groups associated with the footprint.

2. The system of claim 1, wherein:
the cumulative comparison circuitry is coupled to at least the second comparison circuitry to accumulate the maximum or minimum multi-group min/max texel value over a number of iterations of the first and second comparisons sufficient to compare all texel values in the plurality of texel groups associated with the footprint.

3. The system of claim 2, wherein:
the input circuitry comprises one or more input to receive texel data for n texel groups;
the first comparison circuitry comprises:
   2n first stage min/max comparison blocks coupled to the input circuitry, wherein each first stage comparison block is to receive two texel values and output one sub-group min/max texel value; and
   n second stage min/max comparison block coupled to the first stage min/max comparison blocks, wherein each second stage comparison block is to receive two sub-group min/max texel values and output one group-level min/max texel value;
the second comparison circuitry comprises n/2 third stage min/max comparison blocks coupled to the second stage min/max comparison blocks, wherein each third stage comparison block is to receive two group-level min/max texel values and output one multi-group min/max texel value; and
the cumulative comparison circuitry comprises n min/max collectors, wherein each min/max collector is communicatively coupled to one of the second stage min/max comparison blocks and one of the third stage min/max comparison blocks.

4. The system of claim 2, wherein:
the input circuitry comprises one or more input to receive texel data for four texel groups;
the first comparison circuitry comprises:
   eight first stage min/max comparison blocks coupled to the input circuitry, wherein each first stage comparison block is to receive two texel values and output one sub-group min/max texel value; and
   four second stage min/max comparison blocks coupled to the first stage min/max comparison blocks, wherein each second stage comparison block is to receive two sub-group min/max texel values and output one group-level min/max texel value;
the second comparison circuitry comprises two third stage min/max comparison blocks coupled to the second stage min/max comparison blocks, wherein each third stage comparison block is to receive two group-level min/max texel values and output one multi-group min/max texel value; and
the cumulative comparison circuitry comprises four min/max collectors, wherein:
   each second stage min/max comparison blocks is communicatively coupled to one of the min/max collectors; and
   each of the third stage min/max comparison blocks is communicatively coupled to two of the min/max collectors.

5. The system of claim 2, wherein:
the input circuitry comprises one or more input to receive texel data for four texel groups;
the first comparison circuitry comprises:
   eight first stage min/max comparison blocks coupled to the input circuitry, wherein each first stage comparison block is to receive two texel values and output one sub-group min/max texel value; and four second stage min/max comparison blocks coupled to the first stage min/max comparison blocks, wherein each second stage comparison block is to receive two sub-group min/max texel values and output one group-level min/max texel value;

the second comparison circuitry comprises:
two third stage min/max comparison blocks coupled to the second stage min/max comparison blocks, wherein each third stage comparison block is to receive two group-level min/max texel values and output one multi-group min/max texel value; and
a fourth stage min/max comparison block coupled to the third stage min/max comparison blocks, wherein the fourth stage comparison block is to receive two multi-group min/max texel values and output one multi-group min/max texel value; and the cumulative comparison circuitry comprises four min/max collectors, wherein each min/max collector is communicatively coupled to one of the second stage min/max comparison blocks, one of the third stage min/max comparison blocks, and the fourth stage min/max comparison block.

6. The system of claim 2, wherein:
the input circuitry comprises one or more input to receive texel data for four texel groups;
the first comparison circuitry comprises:
eight first stage min/max comparison blocks coupled to the input circuitry, wherein each first stage comparison block is to receive two texel values and output one sub-group min/max texel value; and
four second stage min/max comparison block coupled to the first stage min/max comparison blocks, wherein each second stage comparison block is to receive two sub-group min/max texel values and output one group-level min/max texel value;
the second comparison circuitry comprises:
two third stage min/max comparison block coupled to the second stage min/max comparison blocks, wherein each third stage comparison block is to receive two group-level min/max texel values and output one multi-group min/max texel value; and
a fourth stage min/max comparison block coupled to the third stage min/max comparison blocks, wherein the fourth stage comparison block is to receive two multi-group min/max texel values and output one multi-group min/max texel value; and
the cumulative comparison circuitry comprises four min/max collectors, wherein:
each of the second stage min/max comparison blocks is communicatively coupled to one of the min/max collectors;
each of the third stage min/max comparison blocks is communicatively coupled to two of the min/max collectors; and
the fourth stage min/max comparison block is communicatively coupled to four of the min/max collectors.

7. The system of claim 1, wherein:
the cumulative comparison circuitry further comprises a plurality of min/max collector coupled to receive a same min/max control signal;
each min/max collector is communicatively coupled to the first comparison circuitry to receive different group-level min/max texel values;
each min/max collector is communicatively coupled to the second comparison circuitry to receive the same multi-group min/max values;
each min/max collector is to compare the different group-level min/max texel values to the same multi-group min/max texel values and store the maximum or minimum texel value determined over the number of iterations.

8. The system of claim 1, wherein the comparison circuitry comprises a plurality of min/max comparison blocks, each min/max comparison block further comprising:
one or more data input signal line;
one or more control signal line; and
logic circuitry to pass to one or more data output signal line the larger of two values received on the one or more data input signal line in response to receiving on the one or more control signal line a first control signal indicative of a maximum filter mode, and to pass to the data output the smaller value of the two values in response to a second control signal indicative of a minimum filter mode.

9. The system of claim 1, wherein the comparison circuitry comprises a plurality of min/max comparison blocks, each min/max comparison block further comprising:
a data input signal line;
a control signal line;
a data output signal line;
a subtraction unit coupled to the pair of data input signal line; and
a selector coupled to an output of the subtraction unit, to the input signal line, and to the control input signal line, wherein the selector is to:
differentiate between two values received on the data input signal line based on an output of the subtraction unit; and
pass to the data output signal line the larger of two values received on the data input signal line in response to receiving on the control signal line a first control signal indicative of a maximum filter mode, and to pass to the data output the smaller value of the two values in response to a second control signal indicative of a minimum filter mode.

10. The system of claim 1, wherein the cumulative comparison circuitry further comprises:
an input data signal line to receive the multi-group min/max texel value;
a buffer to store a predetermined default value or a previously determined min/max value;
circuitry coupled to the input data signal line and an output of the buffer, the circuitry to pass to one or more data output signal line the larger of two values received from the input data signal line and the buffer output in response to receiving a first control signal indicative of a maximum filter mode, and to pass the smaller of two values received from the input data signal line and the buffer output in response to receiving a second control signal indicative of a minimum filter mode; and
an update signal line coupling the data output signal to an input of the buffer.

11. The system of claim 1, wherein the cumulative comparison circuitry further comprises:
a selector to select between a first input signal line configured to provide a group-level min/max texel value and a second input signal line configured to provide a multi-group min/max texel value;
a buffer to store a predetermined default value or a previously determined min/max value;
logic circuitry coupled to an output of the selector and an output of the buffer, the logic circuitry to pass to one or more data output signal line the larger of two values received from the selector and the buffer in response to receiving a first control signal indicative of a maximum filter mode, and to pass the smaller of two values received from the selector and the buffer in response to receiving a second control signal indicative of a minimum filter mode; and an update signal line coupling the data output signal to an input of the buffer.

12. A method for determining a min/max texel value for a plurality of texel values associated with a filter footprint, the method comprising:

receiving texel data for texel groups associated with the footprint, wherein each texel group includes four nearest neighboring texels;

iteratively processing the texel data through a binary comparison logic tree, wherein processing the texel data through the binary comparison logic tree further comprises:

performing a first comparison of texel values within texel groups to determine group-level min/max texel values;

performing a second comparison of group-level min/max texel values to determine a multi-group min/max texel value;

performing a cumulative comparison to compare a min/max texel value determined in one iteration with a min/max value determined in another iteration over the number of iterations needed to compare all texel values in the plurality of texel groups associated with the footprint; and storing the maximum or minimum texel value determined from each cumulative comparison.

13. The method of claim 12, wherein the cumulative comparison determines a minimum or maximum multi-group min/max texel value for the number of iterations.

14. The method of claim 13, wherein:
performing the first comparison comprises:
determining a first sub-group min/max texel value based on a comparison of texel values associated with a first pair of texels in a texel group;
determining a second sub-group min/max texel value based on a comparison of texel values associated with a second pair of texels in the texel group; and
determining the group-level min/max texel value based on a comparison of the first and second sub-group min/max texel values; and
performing the second comparison comprises:
determining a first multi-group min/max texel value based on a comparison of group-level min/max texel values associated with a first pair of texel groups;
determining a second multi-group min/max texel value based on a comparison of group-level min/max texel values associated with a second pair of texel groups; and
determining a third multi-group min/max texel value associated with the first and second pair of texel groups based on a comparison of the first and second multi-group min/max texel values.

15. The method of claim 13, wherein:
receiving the texel data comprises receiving texel data for more than four texel groups;
the first and second comparisons are performed for a first iteration to determine a first multi-group min/max texel value;

at least the first comparison is performed to determine one or more second group-level min/max texel value; and
the cumulative comparison comprises:
determining the maximum or minimum of the first multi-group min/max texel value, and the one or more second group-level min/max texel value.

16. The method of claim 13, wherein:
performing the first comparison comprises:
determining eight sub-group min/max texel values based on eight comparisons of texel values associated with pairs of texels in each of the texel groups; and
determining four group-level min/max texel value based on four comparisons of pairs of sub-group min/max texel values;
performing the second comparison comprises:
determining a first and second multi-group min/max texel value based on two comparisons of group-level min/max texel values associated with pairs of texel groups; and
determining a third multi-group min/max texel value associated with the first and second pair of texel groups based on a comparison of the first and second multi-group min/max texel values; and
the cumulative comparison comprises:
separately comparing a plurality of different group-level min/max texel values to the third multi-group min/max value to determine a plurality of maximum or minimum values.

17. The method of claim 12, further comprising:
sending a min/max control signal to a plurality of min/max comparison blocks and a plurality of min/max collectors;
wherein processing the texel data through the binary comparison logic tree is based on the min/max control signal, the logic tree including a plurality of stages, each stage including a min/max comparison block controlled by the min/max control signal; and
wherein the cumulative comparison further comprises:
separately comparing a plurality of different group-level min/max texel values generated by one iteration to a same multi-group min/max value generated in another iteration; and
storing the maximum or minimum texel value determined from each separate comparison over the iterations performed for the footprint.

18. The method of claim 12, wherein the cumulative comparison further comprises:
receiving the multi-group min/max texel value;
storing a predetermined default value or a previously determined min/max value;
passing to one or more data output signal line the larger of the received texel value or stored value in response to receiving a first control signal indicative of a maximum filter mode, and passing the smaller of the received texel value or stored value in response to receiving a second control signal indicative of a minimum filter mode; and
updating the stored value with the value passed to the one or more data output signal line.

19. At least one non-transitory computer-readable media, the media storing instructions thereon, which when executed by a processor, cause the processor to perform a method for determining a min/max texel value for a plurality of texel values associated with a filter footprint, the method comprising:
receiving texel data for texel groups associated with the footprint, wherein each texel group includes four nearest neighboring texels;

iteratively processing the texel data through a binary comparison logic tree;
performing a first comparison by:
  determining a first sub-group min/max texel value based on a comparison of texel values associated with a first pair of texels in a texel group;
  determining a second sub-group min/max texel value based on a comparison of texel values associated with a second pair of texels in the texel group;
performing a cumulative comparison to compare a min/max texel value determined in one iteration with a min/max value determined in another iteration over the number of iterations needed to compare all texel values in the plurality of texel groups associated with the footprint; and
storing the maximum or minimum texel value determined from each cumulative comparison.

20. The media as in claim 19, wherein the media further includes instructions for:
performing the first comparison by:
  determining the group-level min/max texel value based on a comparison of the first and second sub-group min/max texel values; and
performing a second comparison by:
  determining a first multi-group min/max texel value based on a comparison of group-level min/max texel values associated with a first pair of texel groups;
  determining a second multi-group min/max texel value based on a comparison of group-level min/max texel values associated with a second pair of texel groups; and
  determining a third multi-group min/max texel value associated with the first and second pair of texel groups based on a comparison of the first and second multi-group min/max texel values.

* * * * *